(12) United States Patent
Henkensmeier et al.

(10) Patent No.: US 9,954,240 B2
(45) Date of Patent: Apr. 24, 2018

(54) 5-(5-(2,6-DIOXYPHENYL)TETRAZOLE CONTAINING POLYMER, MEMBRANE CONTAINING THE SAME, ELECTROCHEMICAL DEVICE INCLUDING THE MEMBRANE AND METHOD FOR PREPARING THE SAME

(71) Applicants: KOREA INSTITUTE OF SCIENCE AND TECHNOLOGY, Seoul (KR); Jagiellonian University, Crakow (PL)

(72) Inventors: Dirk Henkensmeier, Seoul (KR); Jong Hyun Jang, Seoul (KR); Hyoung-Juhn Kim, Seoul (KR); Jin Young Kim, Seoul (KR); Sung Pil Yoon, Seoul (KR); Jonghee Han, Seoul (KR); Suk Woo Nam, Seoul (KR); Ngoc My Hanh Duong, Seoul (KR); Artur Michalak, Crakow (PL); Karol Dyduch, Radom (PL); Mateusz Brela, Nawojowa Gora (PL)

(73) Assignees: KOREA INSTITUTE OF SCIENCE AND TECHNOLOGY, Seoul (KR); JAGIELLONIAN UNIVERSITY, Krakow (PL)

( * ) Notice: Subject to any disclaimer, the term of this patent is extended or adjusted under 35 U.S.C. 154(b) by 43 days.

(21) Appl. No.: 15/132,011

(22) Filed: Apr. 18, 2016

(65) Prior Publication Data

US 2016/0308229 A1    Oct. 20, 2016

(30) Foreign Application Priority Data

Apr. 20, 2015  (KR) .................. 10-2015-0055518

(51) Int. Cl.
*H01M 8/103* (2016.01)
*H01M 8/1004* (2016.01)
(Continued)

(52) U.S. Cl.
CPC .......... *H01M 8/103* (2013.01); *C08G 65/007* (2013.01); *C08G 65/40* (2013.01);
(Continued)

(58) Field of Classification Search
None
See application file for complete search history.

(56) References Cited

U.S. PATENT DOCUMENTS

| 4,097,479 A | 6/1978 | Leipzig et al. |
| 5,141,843 A * | 8/1992 | Ooms .................. C07D 257/04 |
| | | 430/268 |

(Continued)

FOREIGN PATENT DOCUMENTS

| JP | 64-33153 | * | 2/1989 |
| JP | 2004-331521 A | | 11/2004 |

(Continued)

OTHER PUBLICATIONS

Henkensmeier et al ("Tetrazole Substituted Polymers for High Temperature Polymer Electrolyte Fuel Cells", Journal of Materials Chemistry A (2015), vol. 3(27), p. 14389-14400).*

(Continued)

*Primary Examiner* — Sin J Lee
(74) *Attorney, Agent, or Firm* — Goldilocks Zone IP Law

(57) ABSTRACT

Disclosed are a 5-(2,6-dioxyphenyl)tetrazole-containing polymer, a method for preparing the same, a membrane containing the same and an electrochemical device, particularly a high temperature polymer electrolyte membrane fuel cell, including the membrane. The membrane containing the 5-(2,6-dioxyphenyl)tetrazole-containing polymer is capable of providing high proton conductivity and exhibiting good mechanical properties, thereby capable of providing superior fuel cell performance. Accordingly, the membrane may be usefully used in an electrochemical device, particularly a (Continued)

fuel cell, more particularly a high temperature polymer electrolyte membrane fuel cell.

16 Claims, 25 Drawing Sheets

(51) Int. Cl.
*H01M 8/12* (2016.01)
*H01M 8/1027* (2016.01)
*C08G 65/40* (2006.01)
*C08G 65/48* (2006.01)
*C08G 65/00* (2006.01)
*H01M 8/1018* (2016.01)

(52) U.S. Cl.
CPC ......... *C08G 65/4037* (2013.01); *C08G 65/48* (2013.01); *H01M 8/1004* (2013.01); *H01M 8/1027* (2013.01); *H01M 8/12* (2013.01); *H01M 2008/1095* (2013.01)

(56) References Cited

U.S. PATENT DOCUMENTS

| | | | |
|---|---|---|---|
| 5,602,161 A | 2/1997 | Naito et al. | |
| 7,645,856 B2 * | 1/2010 | Gao | B01D 71/52 429/493 |
| 8,623,928 B2 * | 1/2014 | Du | C08G 65/48 521/32 |
| 2005/0053822 A1 * | 3/2005 | Miyake | C08J 5/2281 429/483 |
| 2009/0068524 A1 | 3/2009 | Li et al. | |

FOREIGN PATENT DOCUMENTS

| | | |
|---|---|---|
| JP | 5625317 B2 | 11/2014 |
| KR | 1996-0014113 A | 5/1996 |

OTHER PUBLICATIONS

N. Gourdoupi et al., New proton conducting polymer blends and their fuel cell performance, Journal of Power Sources, 2010, pp. 170-174, vol. 195.

C. Morfopoulou et al., The Effect of Structural Variations on Aromatic Polyethers for High-Temperature PEM Fuel Cells, Journal of Polymer Science Part A: Polymer Chemistry, Aug. 9, 2011, pp. 4325-4334, vol. 49.

Christina I. Morfopoulou et al., Cross-linked high temperature polymer electrolytes through oxadiazole bond formation and their applications in HT PEM fuel cells, J. Mater. Chem. A, 2013, pp. 1613-1622, vol. 1.

J. Yang et al., Phosphoric acid doped imidazolium polysulfone membranes for high temperature proton exchange membrane fuel cells, Journal of Power Sources, Jan. 9, 2012, pp. 114-121, vol. 205.

J.S. Yang et al., High Molecular Weight Polybenzimidazole Membranes for High Temperature PEMFC', Fuel Cells, 2014, pp. 1-9, vol. 0.

H. Cho et al., meta-PBI/methylated PBI-OO blend membranes for acid doped HT PEMFC', European Polymer Journal, Jul. 1, 2014, pp. 135-143, vol. 58.

Zejun Pu et al., Influence of composition on the proton conductivity and mechanical properties of sulfonated poly(aryl ether nitrite) copolymers for proton exchange membranes, Journal of Polymer Research, Oct. 14, 2013, vol. 20.

Zachary P. Demko et al., Preparation of 5-Substituted I H-Tetrazoles from Nitriles in Water, J. Org. Chem., Nov. 3, 2001, pp. 7945-7950, vol. 66.

* cited by examiner

5-(5-(2,6-DIOXYPHENYL)TETRAZOLE CONTAINING POLYMER, MEMBRANE CONTAINING THE SAME, ELECTROCHEMICAL DEVICE INCLUDING THE MEMBRANE AND METHOD FOR PREPARING THE SAME

CROSS-REFERENCE TO RELATED APPLICATION

This application claims the priority of Korean Patent Application No. 10-2015-0055518, filed on Apr. 20, 2015, and all the benefits accruing therefrom under 35 U.S.C. § 119, the contents of which in its entirety are herein incorporated by reference.

BACKGROUND

1. Field

The present disclosure relates to 5-(2,6-dioxyphenyl)tetrazole-containing polymer, a membrane containing the same, an electrochemical device including the membrane and a method for preparing the same.

2. Description of the Related Art

In general, high temperature polymer electrolyte membrane fuel cells (HT PEMFCs) operate in the temperature range of 120-200° C. Gas streams are usually unhumidified but can also contain water if the cell is connected to a reformer.

Since no liquid water can exist under these conditions unless a very high pressure is applied, the electrolyte is usually based on phosphoric acid (PA).

In contrast to phosphoric acid fuel cells (PAFCs) where, e.g., an inorganic SiC matrix is used to immobilize liquid phosphoric acid (PA), the high temperature polymer electrolyte membrane fuel cells (HT PEMFCs) employ phosphoric acid absorbed in a dense polymeric membrane.

The most common membrane type is phosphoric acid-doped polybenzimidazole (FBI), in which PA interacts with the basic nitrogen atoms of the imidazole rings.

While only one phosphoric acid molecule interacts strongly with an imidazole ring, several more phosphoric acid molecules can be absorbed by hydrogen bonding. Up to 5-6 phosphoric acid molecules per imidazole can be doped when meta-PBI is immersed in an 85 wt % phosphoric acid solution at room temperature.

Membranes prepared by a sol-gel method, in which FBI precipitates out of a polyphosphoric acid (PPA) solution as the temperature decreases and polyphosphoric acid is hydrolyzed by ambient humidity to phosphoric acid, can even keep up to about 20 phosphoric acid molecules per imidazole.

So far, most of researches have been dedicated to PBI-based systems and there are only limited researches on alternative materials.

For example, aromatic polyethers incorporating pyridine moieties in the backbone have been studied.

Some researchers also reported that use of imidazole moieties as a side group in aromatic polymers or as part of radiation-grafted polymers.

SUMMARY

The present disclosure is directed to providing a 5-(2,6-dioxyphenyl)tetrazole-containing polymer capable of providing high proton conductivity even at low phosphoric acid content and exhibiting good mechanical properties, thereby capable of providing superior fuel cell performance, a composition thereof, a membrane containing the same, an electrochemical device including the membrane and a method for preparing the same.

In some embodiments, the present disclosure provides a polymer containing a dioxyphenyl)tetrazole structural unit, a polymer composition wherein the polymer is blended with another polymer, particularly a basic polymer, and a method for preparing the same.

In particular, in some embodiments, the present disclosure provides a 5-(2,6-dioxyphenyl)tetrazole-containing polymer comprising a structural unit represented by [Chemical Formula 1]:

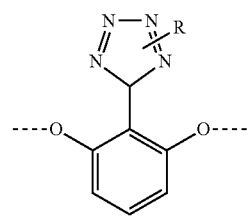

[Chemical Formula 1]

wherein R is H, alkyl ($C_1$-$C_{12}$ alkyl, linear or branched) or benzyl.

In an example embodiment, the 5-(2,6-dioxyphenyl)tetrazole-containing polymer may be obtained from one or more of the following monomers:

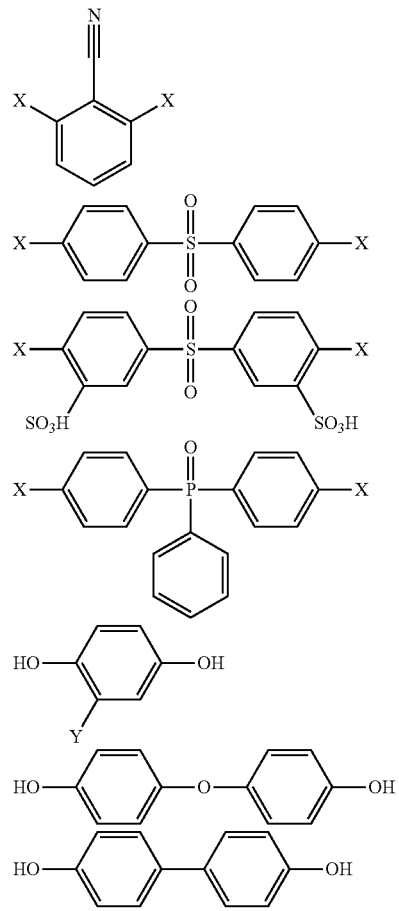

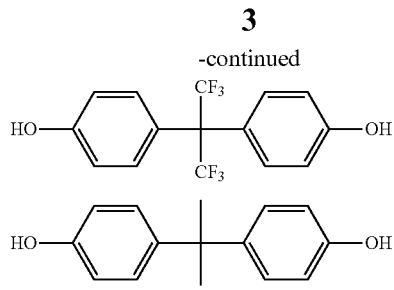

wherein X is Cl, F or OH and Y is H, methyl or SO₃H.

In an example embodiment, the 5-(2,6-dioxyphenyl)tetrazole-containing polymer may be one or more of the following compounds:

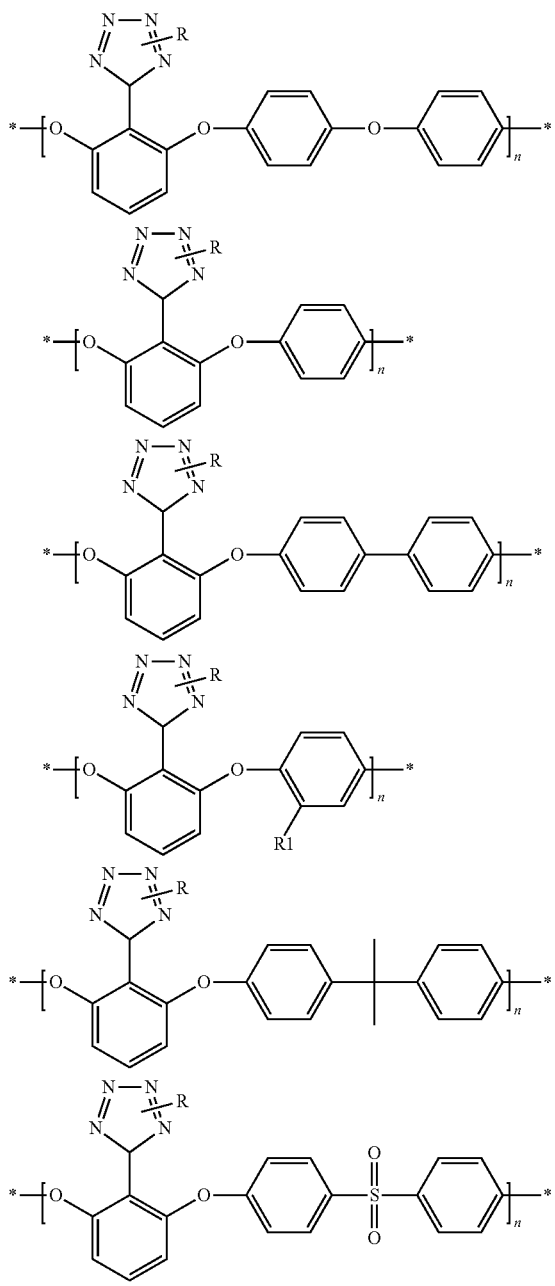

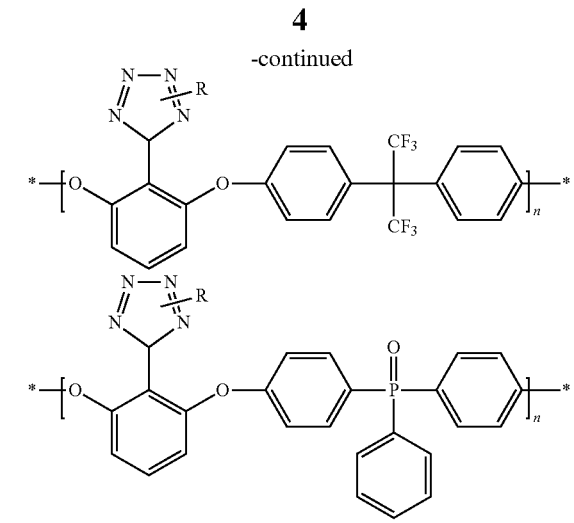

wherein R is H, alkyl ($C_1$-$C_{12}$ alkyl, linear or branched) or benzyl and R1 is one or more selected from H, methyl or SO₃H.

In an example embodiment, unreacted nitrile groups may be present in part of the 5-(2,6-dioxyphenyl)tetrazole-containing polymer.

In an example embodiment, the 5-(2,6-dioxyphenyl)tetrazole-containing polymer is capable of exhibiting resonance stabilization of positive charge as tetrazole groups are protonated to tetrazolium ions.

In an example embodiment, the 5-(2,6-dioxyphenyl)tetrazole-containing polymer is capable of providing sites for proton hopping in protonated state.

In some embodiments, the present disclosure provides a polymer composition comprising the 5-(2,6-dioxyphenyl)tetrazole-containing polymer.

In an example embodiment, the polymer composition is a polymer composition wherein the 5-(2,6-dioxyphenyl)tetrazole-containing polymer is blended with a basic polymer.

In an example embodiment, the polymer composition is a polymer composition in which one or more selected from a group consisting of Nafion, a Nafion derivative, sulfonated poly(ether ether ketone) (SPEEK), sulfonated polysulfone, polysulfone, polyether, polyvinyl alcohol (PVA), meta-PBI, para-PBI, ortho-PBI, a FBI derivative, polyvinylphosphonic acid and a polymer containing pyridine or aminopyridine groups in main chain of the polymer or tethered to main chain of the polymer is blended with the 5-(2,6-dioxyphenyl)tetrazole-containing polymer.

In some embodiments, the present disclosure provides a method for preparing a 5-(2,6-dioxyphenyl)tetrazole-containing polymer, which comprises preparing a compound of [Chemical Formula 1] by introducing a 2,6-dioxyphenyl group to tetrazole:

[Chemical Formula 1]

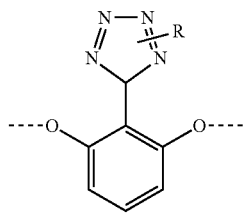

wherein R is H, alkyl ($C_1$-$C_{12}$ alkyl, linear or branched) or benzyl.

In an example embodiment, the method for preparing a 5-(2,6-dioxyphenyl)tetrazole-containing polymer may comprise: condensation polymerizing one or more of the following monomers; and reacting the nitrile group of the resulting condensation polymer with an azide:

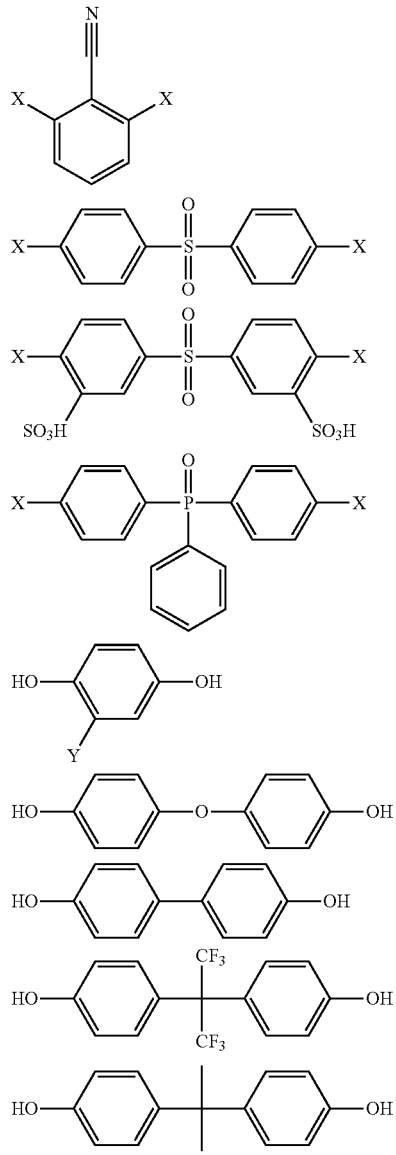

wherein X is Cl, F or OH and Y is H, methyl or $SO_3H$.

In some embodiments, the present disclosure provides a membrane composed of the polymer or the polymer composition and an electrochemical device, particularly a fuel cell, more particularly a high temperature polymer electrolyte membrane fuel cell including the membrane.

In particular, the present disclosure provides a membrane formed of: a 5-(2,6-dioxyphenyl)tetrazole-containing polymer comprising a structural unit represented by [Chemical Formula 1]; or a polymer composition comprising the 5-(2,6-dioxyphenyl)tetrazole-containing polymer:

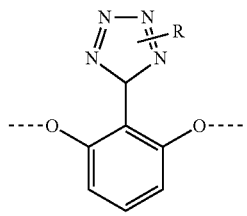

[Chemical Formula 1]

wherein R is H, alkyl ($C_1$-$C_{12}$ alkyl, linear or branched) or benzyl.

In an example embodiment, the membrane is a phosphoric acid-doped membrane.

In an example embodiment, the membrane has a phosphoric acid (PA) uptake of 20-2000 wt %.

In an example embodiment, provided is an electrochemical device comprising the membrane.

In an example embodiment, the electrochemical device is a fuel cell.

In an example embodiment, the fuel cell is a high temperature polymer electrolyte membrane fuel cell.

In an example embodiment, the high temperature polymer electrolyte membrane fuel cell is a polymer electrolyte membrane fuel cell that is capable of operating at 160° C.

The 5-(2,6-dioxyphenyl)tetrazole-containing polymer, the composition wherein the polymer is blended with another polymer, particularly a basic polymer and the membrane including the same according to the present disclosure may provide high proton conductivity even at low phosphoric acid content and exhibit good mechanical properties. Therefore, they may provide superior performance, particularly superior fuel cell performance, particularly, high temperature polymer electrolyte membrane fuel cell performances. Accordingly, the membrane may be usefully used in electrochemical devices, particularly fuel cells, more particularly high temperature polymer electrolyte membrane fuel cells.

BRIEF DESCRIPTION OF THE DRAWINGS

The above and other aspects, features and advantages of the disclosed example embodiments will be more apparent from the following detailed description taken in conjunction with the accompanying drawings in which:

FIG. 10 shows the Arrhenius plots of PA-doped TZ-PEEN and TZ-SPEEN membranes according to an example embodiment.

DETAILED DESCRIPTION

Figure 1A:
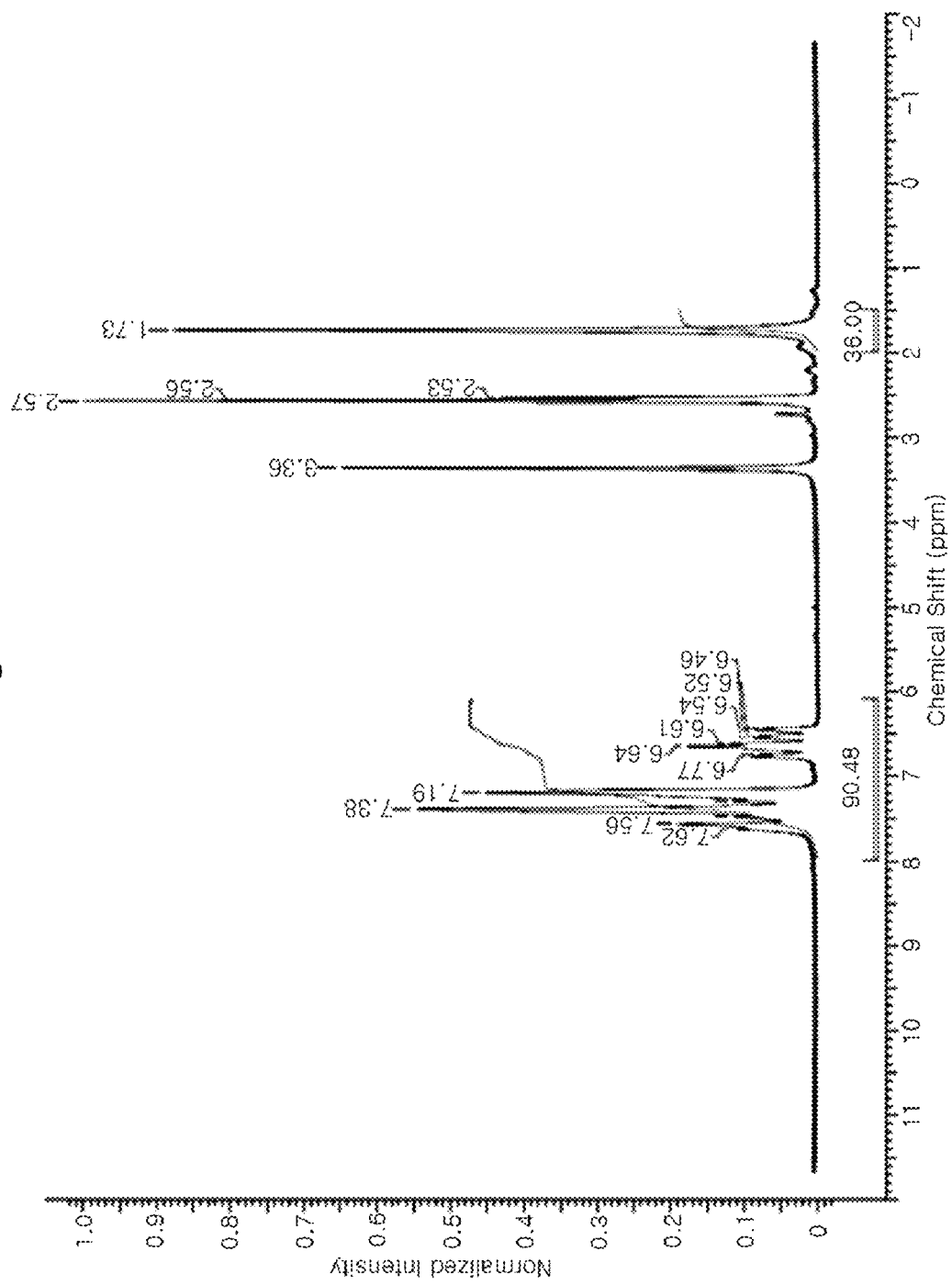
FIG. 1A shows the NMR spectrum of SPEEN according to an example embodiment.

Hereinafter, the example embodiments of the present disclosure are described in detail.

In an aspect, the present disclosure provides a 5-(2,6-dioxyphenyl)tetrazole-containing polymer containing a structural unit represented by [Chemical Formula 1]:

[Chemical Formula 1]

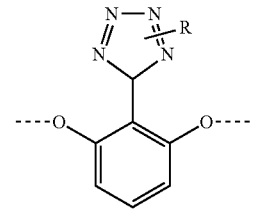

wherein R is H, alkyl ($C_1$-$C_{12}$ alkyl, linear or branched) or benzyl.

This polymer may be prepared by introducing a 2,6-dioxyphenyl group to tetrazole (particularly, C5 position of tetrazole).

As described below, DFT analysis suggests that the polymer can have a coplanar structure and, therefore, the basicity of tetrazole groups can be increased due to resonance stabilization of positive charge as the tetrazole groups are protonated to tetrazolium ions. This coplanar structure is stabilized by the hydrogen bonding between the proton of the tetrazole and the ether oxygen atom(s). Molecular electrostatic potential calculations as described below also indicate that the protonated state (tetrazolium ions) can provide sites for proton hopping.

Accordingly, very high proton conductivity may be achieved in doped or undoped state (even at very low phosphoric acid uptake), and the proton conductivity may be further improved when it is blended with a basic polymer. Also, the polymer may be used for high temperature polymer electrolyte membrane fuel cells.

In an example embodiment, the polymer the may be obtained from one or more of the following monomers. For example, the tetrazole-containing polymer may be obtained by condensation polymerizing one or more of the monomers and then reacting a nitrile group with an azide.

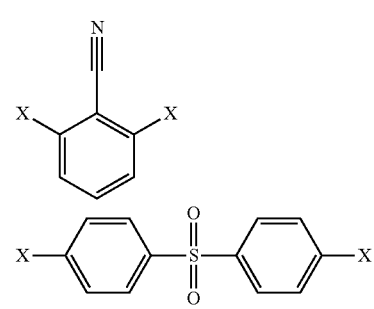

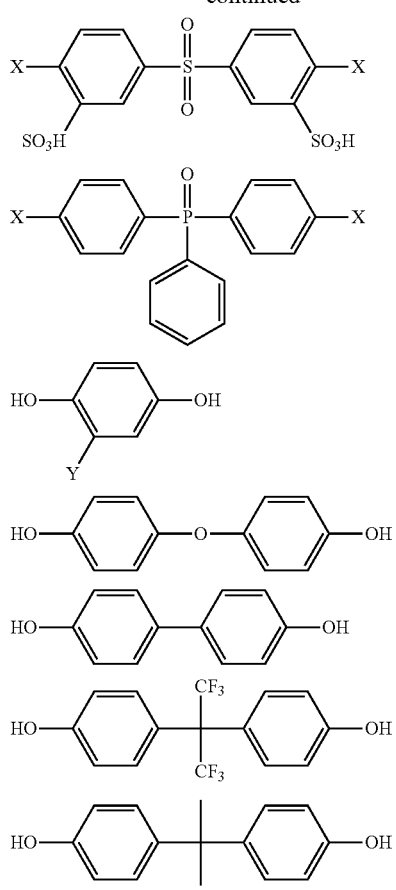

In the above formulas, X is Cl, F or OH and Y is H, methyl or SO₃H.

In an example embodiment, the polymer may be one or more of the following compounds.

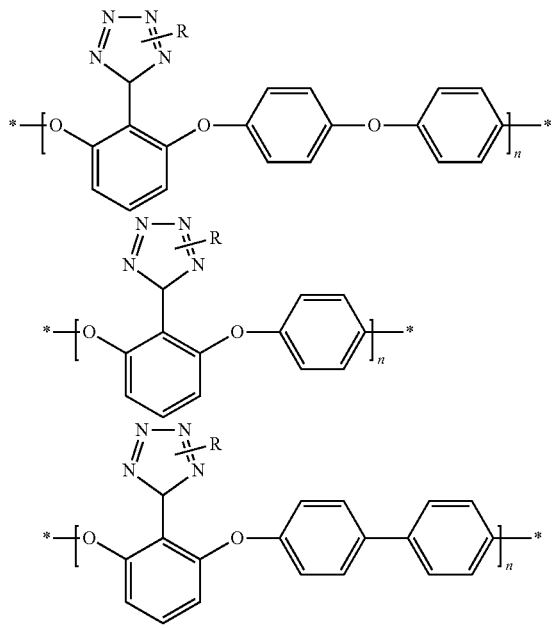

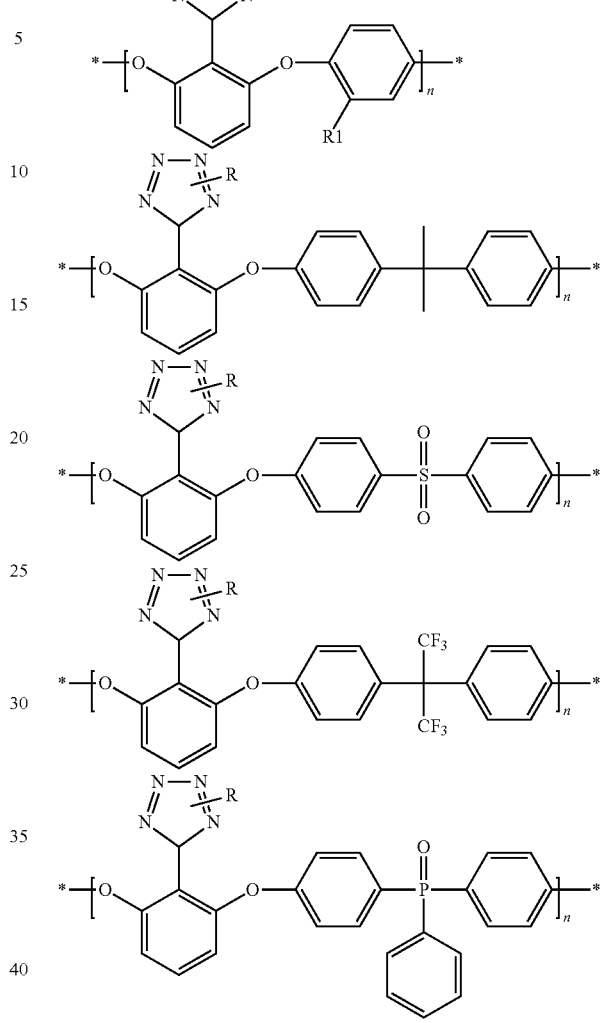

In the above formulas, R is H, alkyl ($C_1$-$C_{12}$ alkyl, linear or branched) or benzyl and R1 is one or more selected from H, methyl or SO₃H (That is to say, R1 may be H in a part of the polymer, methyl in another part and SO₃H in still another part. Explaining more in detail, the sum of the moles of phenyl wherein R1 is H, the moles of phenyl wherein R1 is methyl and the moles of phenyl wherein R1 is SO₃H is equal to the total moles of phenyl substituted with R1.).

Nitrile groups may be contained (that is to say, unreacted nitrile (CN) groups may be present) in part of the polymer. As for a non-limiting example, the proportion of the nitrile groups substituted with tetrazole groups in the polymer may be 0.3-1 [moles of tetrazole/(moles of tetrazole+moles of unsubstituted nitrile)=0.3-1].

In an example embodiment, the 5-(2,6-dioxyphenyl)tetrazole-containing polymer may be blended with another polymer (acidic, neutral or basic polymer), particularly a basic polymer. The compositional ratio of the blended another polymer (particularly a basic polymer) and the 5-(2,6-dioxyphenyl)tetrazole-containing polymer in the polymer composition may be, for example, 1-99 wt %, although not being specially limited thereto.

In an example embodiment, the polymers blended with the 5-(2,6-dioxyphenyl)tetrazole-containing polymer may be as follows.

That is, examples of the acidic polymer may include Nafion, a Nafion derivative, SPEEK [sulfonated poly(ether ether ketone)], sulfonated polysulfone, polysulfone, polyether, etc.

Further, examples of the neutral polymer may include polyvinyl alcohol (PVA), etc.

In addition, examples of the basic polymer may include meta-PBI, para-PBI, ortho-PBI and a PBI derivative. The PBI derivative may be, e.g., PBI-OO, or poly[(1-(4,40-diphenylether)-5-oxybenzimidazole)-benzimidazole)], ABPBI, etc. Also, polyvinylphosphonic acid, polymers containing pyridine or aminopyridine groups in the main chain or tethered to the main chain, etc. may be used as the basic polymer. Non-limiting examples of the polymer are as follows.

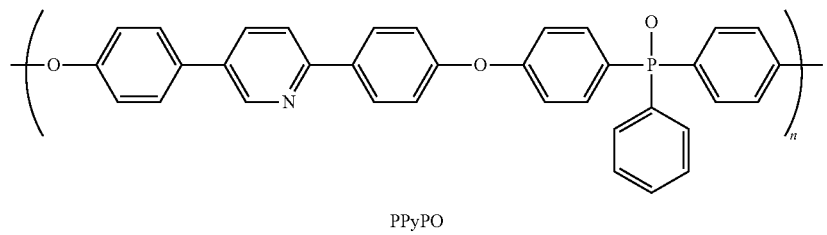

PPyPO

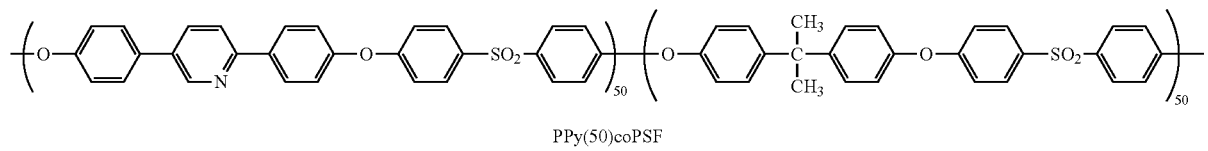

PPy(50)coPSF

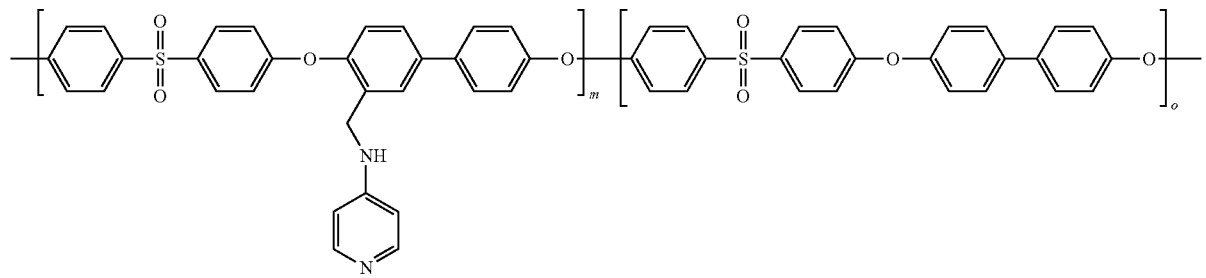

In another aspect, the present disclosure provides a membrane formed of the polymer or the polymer composition (blend).

In an example embodiment, the membrane may be a phosphoric acid-doped membrane, e.g., one having a phosphoric acid (PA) uptake of 20-2000 wt %.

In another aspect, the present disclosure provides an electrochemical device, particularly a fuel cell, more particularly a high temperature polymer electrolyte membrane fuel cell, which includes the membrane. In particular, the high temperature polymer electrolyte membrane fuel cell can operate at 160° C. This is the highest operating temperature reported so far for the tetrazole-based system.

Hereinafter, the present disclosure will be described in detail through examples. However, the following examples are for illustrative purposes only and it will be apparent to those of ordinary skill in the art that the scope of the present disclosure is not limited by the examples.

Example and Comparative Example

1. Polymer Synthesis

Materials

Dimethyl sulfoxide (DMSO) was obtained from Daejung Chemical and dimethyl sulfoxide-$d_6$ (DMSO-$d_6$, 99.9% D) was obtained from Cambridge Isotope Laboratories. 2,6-Difluorobenzonitrile was obtained from Oakwood Products. 2-Methylhydroquinone, bisphenol A, hydroquinonesulfonic acid potassium salt, sodium azide (NaN$_3$), zinc chloride (ZnCl$_2$), dimethylacetamide (DMAc), N-methyl-2-pyrrolidone (NMP), toluene and potassium carbonate (K$_2$CO$_3$) were obtained from Sigma-Aldrich. All the chemicals were used without further purification.

Synthesis of PEEN (Poly(Ether Ether Nitrile))

In a three-necked round-bottom flask, fitted with stirrer and a Dean-Stark trap, 2.78 g (20 mmol) of 2,6-difluorobenzonitrile, 2.48 g (20 mmol) of 2-methylhydroquinone and 5.52 g of potassium carbonate (K$_2$CO$_3$) were dissolved in a mixture of 35 mL of anhydrous dimethylacetamide (DMAc) and 31 mL of anhydrous toluene.

After thorough flushing with nitrogen, the mixture was heated under stirring at 150° C. for 4 hours, in order to remove water by azeotropic distillation with toluene.

When toluene was completely removed, the suspension was heated at 180° C. until the viscosity increased visibly. The reaction mixture was cooled down. The polymer precipitated in deionized (DI) water was washed for 24 hours and dried in vacuum at 60° C. for 48 hours.

Synthesis of SPEEN (Sulfonated Poly(Ether Ether Nitrile Sulfone))

2.78 g (20 mmol) of 2,6-difluorobenzonitrile, 2.74 g (12 mmol) of bisphenol A, 1.83 g (8 mmol) of hydroquinonesulfonic acid potassium salt and 5.52 g of potassium carbonate (K$_2$CO$_3$) were dissolved in a mixture of 25 mL of anhydrous dimethylacetamide (DMAc) and 31 mL of anhydrous toluene.

After thorough flushing with nitrogen, the mixture was heated under stirring at 150° C. for 4 hours, in order to remove water by azeotropic distillation with toluene. When toluene was completely removed, the suspension was heated at 170° C. until the viscosity increased visibly. The reaction mixture was cooled down. The polymer precipitated in deionized (DI) water was washed for 24 hours and dried under reduced pressure at 60° C. for 24 hours.

Analysis result is as follows:

$^1$H NMR (300 MHz, DMSO-d$_6$, ppm): 7.19-7.62 [m, ca. 70H, aromatic protons of BPA (7.38 and 7.19 ppm), hydroquinonesulfonic acid moiety, proton in para-position to nitrile], 6.43-6.77 (m, ca. 20H, aromatic protons in meta-position to nitrile), 1.73 (s, 36H, BPA-CH$_3$).

The structure of SPEEN is as follows.

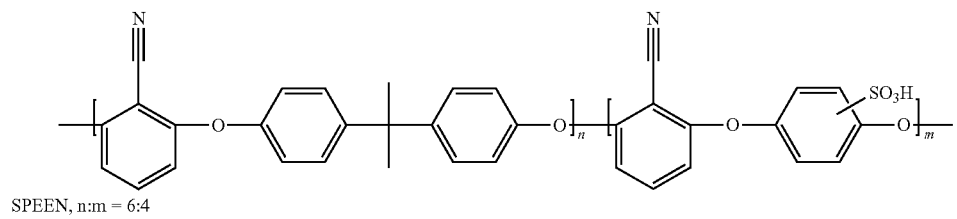

SPEEN, n:m = 6:4

Synthesis of P1

1.394 g (10 mmol) of 2,6-difluorobenzonitrile, 2.2829 g (10 mmol) of bisphenol A and 4 g of potassium carbonate (K$_2$CO$_3$) were dissolved in a mixture of 25 mL of anhydrous NMP and 50 mL of toluene.

After thorough flushing with argon, the mixture was heated under reflux for 4 hours to remove water by azeotropic distillation with toluene (e.g., using a Dean-Stark trap). After removal of toluene, the reaction mixture was heated more for about 18 hours at 145° C.

The reaction mixture was cooled down. The polymer precipitated in deionized (DI) water was washed several times with water and methanol, and dried under reduced pressure at 60° C.

Analysis result is as follows:

Yield: 2.87 g. $^1$H NMR (300 MHz, DMSO-d$_6$, ppm): 7.52 (m, 1H, proton para to nitrile), 7.34 (m, 4H, protons meta to isopropylidene), 7.14 (m, 4H, protons ortho to isopropylidene), 6.59/6.60 (m, 2H, proton meta to nitrile), 1.70 (s, 6H, isopropylidene).

The structure of P1 is as follows.

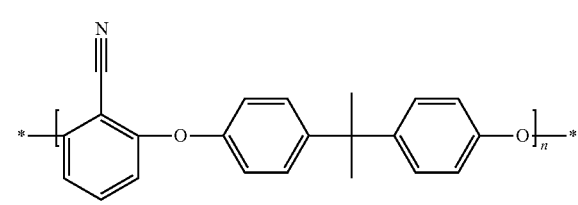

P1

Synthesis of P2

1.9627 g (10 mmol) of hydroquinonesulfonic acid potassium salt (HQSA) and 4 g of potassium carbonate (K$_2$CO$_3$) were dissolved in a mixture of 30 mL of DMAc and 40 mL of toluene.

After thorough flushing with argon, the mixture was heated under reflux to remove water by azeotropic distillation with toluene (e.g., using a Dean-Stark trap). After removal of toluene, 1.3911 g (10 mmol) of 2,6-difluorobenzonitrile was added and the mixture was heated for several hours at 180° C.

The reaction mixture which is not very viscous was cooled down. The polymer precipitated in deionized (DI) water was separated from the solution by filtration or centrifugation.

After drying under reduced pressure at 60° C., 0.79 g of the polymer was obtained. Analysis result is as follows:

$^1$H NMR (300 MHz, DMSO-d$_6$, ppm): 7.61-7.25 (m, 4H, proton para to nitrile and protons from HQSA), (6.91/6.93), 6.77/6.79, 6.63/6.65, 6.48/6.51 and 6.39/6.41 (m, 2H, protons meta to nitrile).

The structure of P2 is as follows.

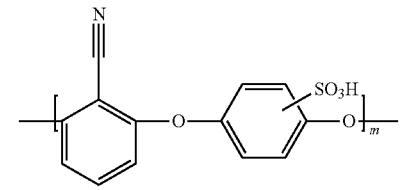

P2

Figure 1B:
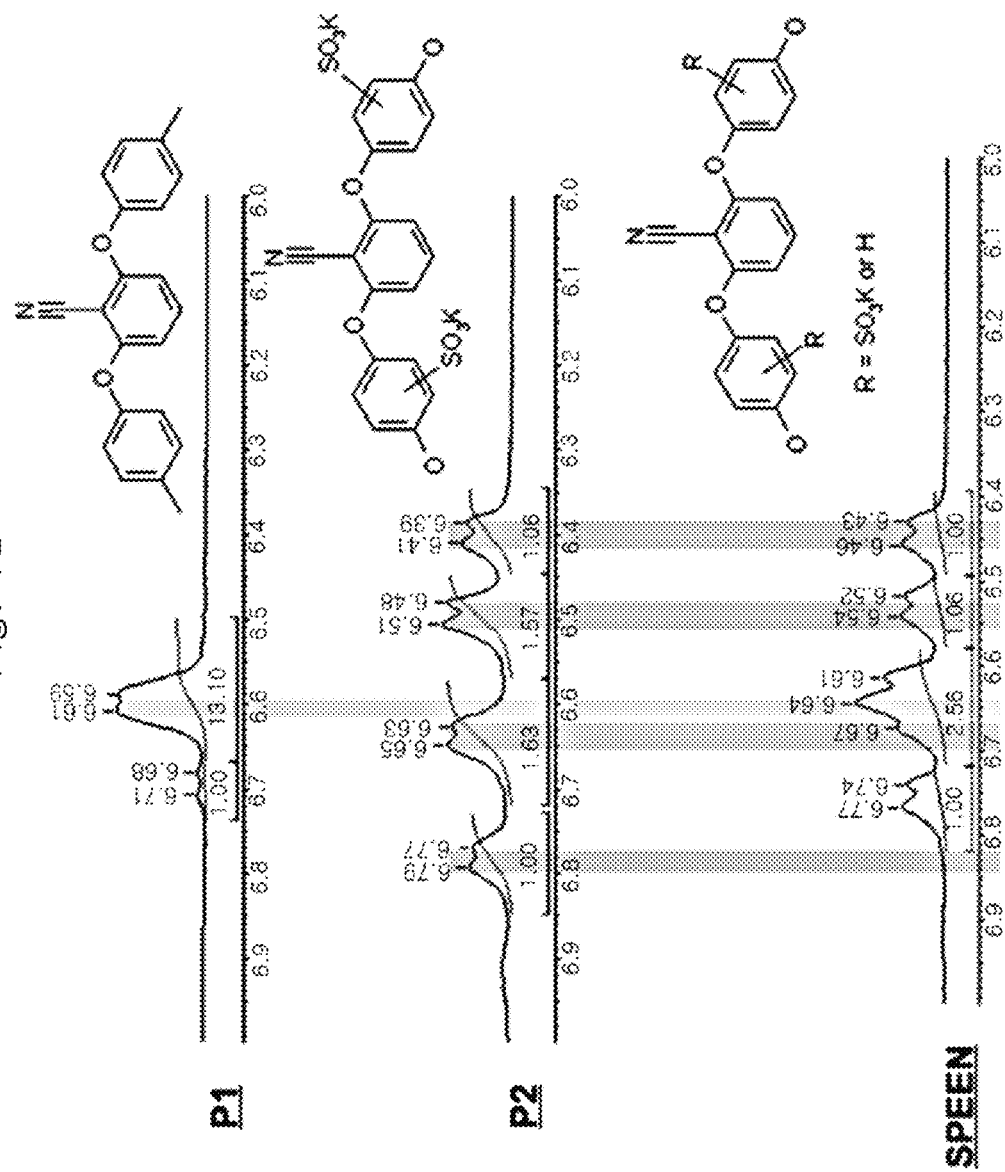
FIG. 1B compares the NMR spectra of SPEEN, P1 and P2 according to an example embodiment.
Figure 1C:
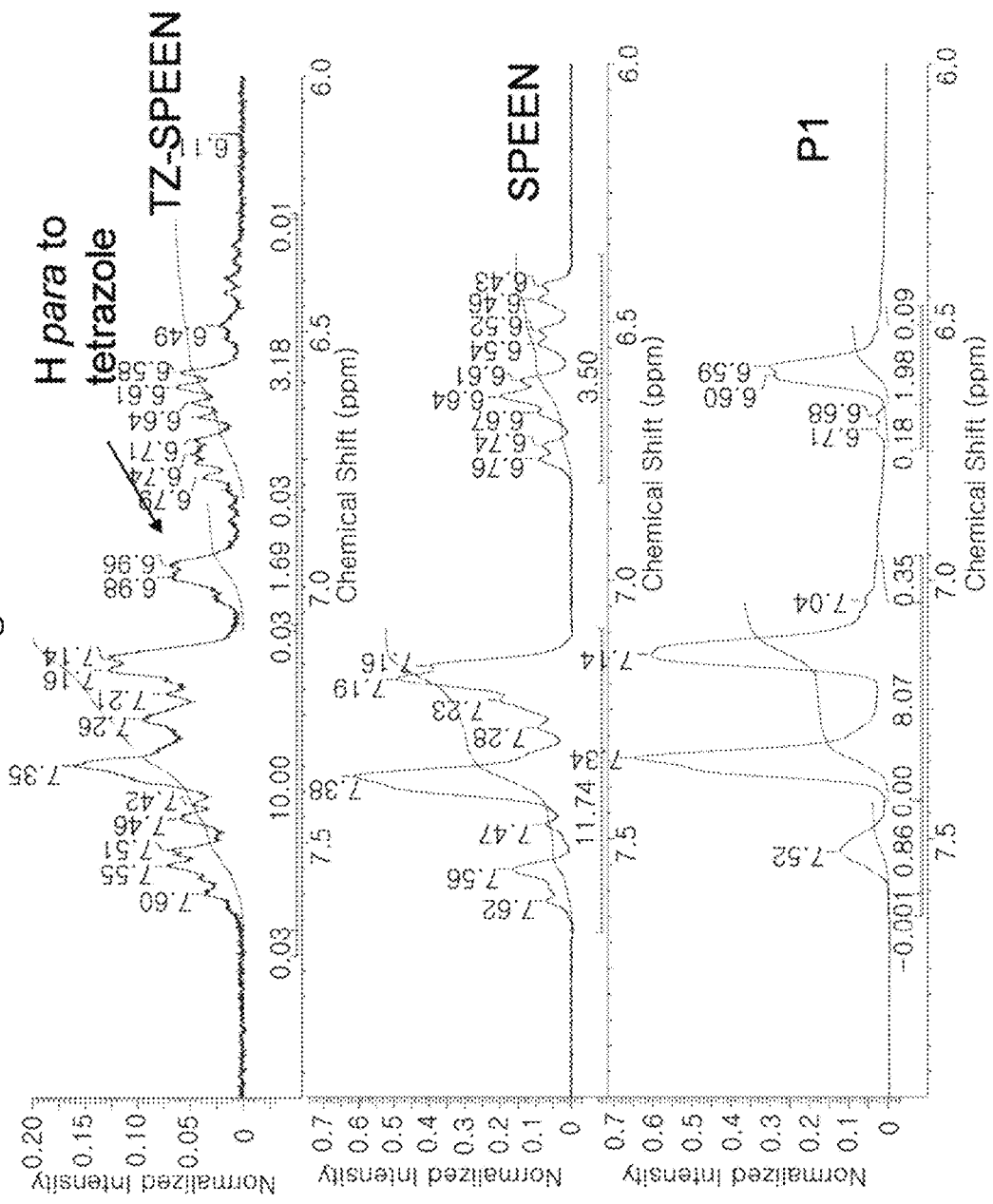

FIG. 1A shows the NMR spectrum of SPEEN prepared in this example and FIG. 1B compares the NMR spectra of SPEEN, P1 and P2 prepared in this example.

Preparation of Tetrazole-Containing PEEN (TZ-PEEN) and Tetrazole-Containing SPEEN (TZ-SPEEN)

First, 1 g of PEEN or SPEEN prepared above was dissolved in 24 mL of NMP at 140° C. NaN$_3$ and anhydrous ZnCl$_2$ (with the molar ratio of —CN/ZnCl$_2$/NaN$_3$ 1:4:4) were introduced later into the flask. The reaction mixture was stirred at 140° C. for a total of 6 days.

The withdrawn sample was heated at 60° C. for 1 hour in dilute HCl, filtered, washed on the filter with the dilute HCl followed by water, and then dried under reduced pressure at 60° C. for 24 hours.

Figure 10:
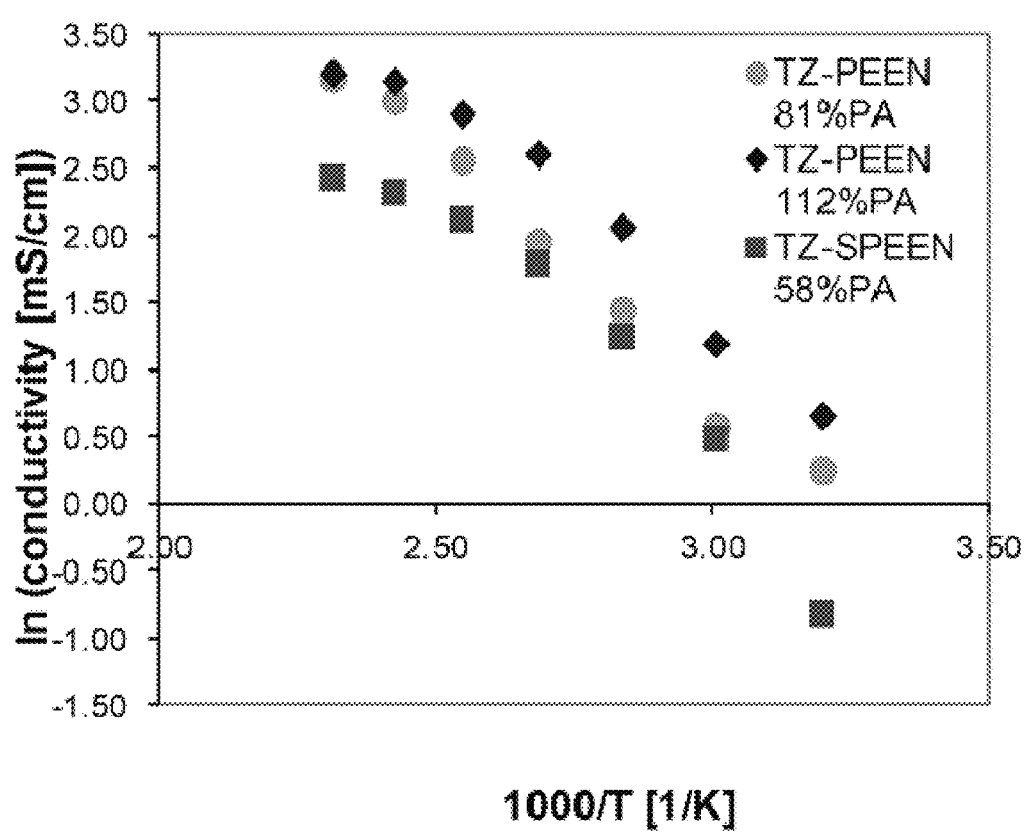
FIG. 10 compares the NMR spectra of TZ-SPEEN, SPEEN and P2 according to an example embodiment.

FIG. 10 compares the NMR spectra of TZ-SPEEN, SPEEN and P2 prepared in this example.

2. Polymer Characterization

Chemical structures were characterized using a Bruker 400 MHz nuclear magnetic resonance (NMR) spectrometer.

FT-IR spectra were recorded on a Lambda Scientific FTIR 7600 spectrometer with a single bounce diamond ATR accessory with film samples at 4 cm$^{-1}$ resolution, 16 scans, over the 400–4000 cm$^{-1}$ range.

3. Preparation of Membrane and Acid Doping

TZ-PEEN and TZ-SPEEN were dissolved in NMP to obtain 5 wt % solution solutions at room temperature.

The solutions were then filtrated through polypropylene filters (pore size 0.45 μm) into Petri dishes and dried at 60° C., first under ambient pressure for 1 hour, later under vacuum for 24 hours.

Acid doping of the membranes was performed by immersing the membranes in an 85 wt % phosphoric acid solution at 30° C., 80° C. or 120° C. Phosphoric acid (PA) content was measured based on the weight change of the membrane before and after the doping. The PA content (wt %, PA uptake) was calculated as follows:

$$\% \ PA_{uptake} = \frac{W_t - W_0}{W_0} \times 100 \quad \text{[Equation 1]}$$

where $W_t$ and $W_0$ are the weights of the membrane after the doping and before the doping, respectively.

4. Membrane Characterization

Mechanical Testing

Tensile test was performed on a Cometech QC-508E universal testing machine. Samples were cut from one membrane with the sample size of 1 cm×4 cm. 4 samples were prepared for each kind of membrane. The samples were stretched at the elongation speed of 10 mm/min. For each measurement, humidity and temperature were recorded as the mechanical properties greatly depend on environmental conditions. The maximum stress was taken as the tensile strength.

Size Exclusion Chromatography (SEC)

SEC was performed on a Shimadzu HPLC instrument, equipped with two PolarSil columns (100 and 300 Å) from Polymer Standards Service (PSS) and a Shimadzu refractive index detector.

The samples were run in DMAC containing 0.5 wt % LiCl at 60° C. at a flow rate of 1 ml/min.

Calibration was made with 17 narrow molecular weight PMMA standards from PSS in the molecular weight range of 800 to 1600000 and the LabSolutions GPC software.

Thermogravimetric Analysis

Thermal stability of the membranes was measured with a thermogravimetric analyzer (TGA Q50).

Sample weights were around 10 mg, and the temperature was increased at a rate of 10° C./min from room temperature to 100° C., kept for 30 minutes, and then increased again at the same heating rate to 900° C. in a nitrogen stream.

Proton Conductivity

A Zahner IM6 impedance analyzer (ZAHNER-Elektrik GmbH & CoKG, Kronach, Germany) was used to measure electrochemical impedance spectra of the membranes.

Membrane samples (4 cm×1 cm) were doped with phosphoric acid and dried at 110° C. for 5 hours to evaporate water. After that, the membrane was measured in the frequency range of 0.1 Hz to 100 kHz with an amplitude of 50 nA by a 4-probe method. The conductivity σ was calculated as follows:

$$\sigma[mS/cm] = \frac{1000d}{twR} \quad \text{[Equation 2]}$$

where d is the distance between the inner electrodes (1 cm), t and w are the thickness and width (1 cm) of the membrane strip, and R is the resistance [ohm], as obtained from the x-axis intercept of the curve in the Nyquist plot.

Preparation of MEA and Fuel Cell Testing

Catalyst powder (46.3% Pt/C from TKK, Japan) and a PTFE dispersion (60 wt % in water from Sigma, Korea) were dispersed in isopropyl alcohol and distilled water (IPA:water=4:1 wt/wt) with a solid PTFE to Pt/C ratio of 1:4.

The catalyst ink was sprayed uniformly onto a gas diffusion layer (SGL GDL 10 BC) using an automatic spraying machine to prepare gas diffusion electrodes (GDE). The gas diffusion electrodes were then heat-treated for 5 minutes at 350° C. under nitrogen atmosphere.

Platinum (Pt) loading on each electrode was 1.03 mg cm$^{-2}$.

The MEAs, with an active electrode area of 7.84 cm$^2$, were assembled into a single cell without hot pressing, and screws were fastened with a torque of 80 pound inch (9.04 Nm).

The single cells were operated at 160° C. and ambient pressure with non-humidified $H_2$ and air. The gas flow rates were 100 sccm and 300 sccm, respectively.

Fuel cell performance was characterized by continuously measuring the potential at constant current (200 mA·cm$^{-2}$) at 160° C. and i-V curves.

Computational Details of DFT Analysis

Theoretical calculations with Density Functional Theory (DFT) methodology using the Becke88 exchange and Perdew86 correlation functional (BP86) were performed using the Amsterdam Density Functional (ADF) program (version 2013.01).

A standard triple-ζ STO basis included in the ADF package with one set of polarization functions was applied for all atoms.

Scalar relativistic effects were included by employing the zero-order regular approximation (ZORA).

Charge distribution was analyzed with the Hirshfeld atomic charges and molecular electrostatic potential.

5. Results and Discussion

Synthesis of Tetrazole-Modified Poly(Arylene Ether)s

Tetrazoles can be synthesized via [2+3] cycloaddition of nitrile groups with sodium azide.

To enhance the reaction kinetics, usually acidic catalysts are added. While this reaction can be handled well on small scale, the potential evolution of $HN_3$ may raise safety issues especially for larger batch reactions. An apparently safe procedure for the kilogram scale was reported.

Aromatic nitrile group-containing polymers can react with sodium azide ($NaN_3$) in a polymer-analogous reaction.

Based on this, two nitrile-containing poly(arylene ether)s (PEEN and SPEEN) were synthesized and substituted with tetrazole (TZ-PEEN and TZ-SPEEN) (see Scheme 1 below, which is rotated 90 degrees in left direction for clarification).

[Scheme 1]

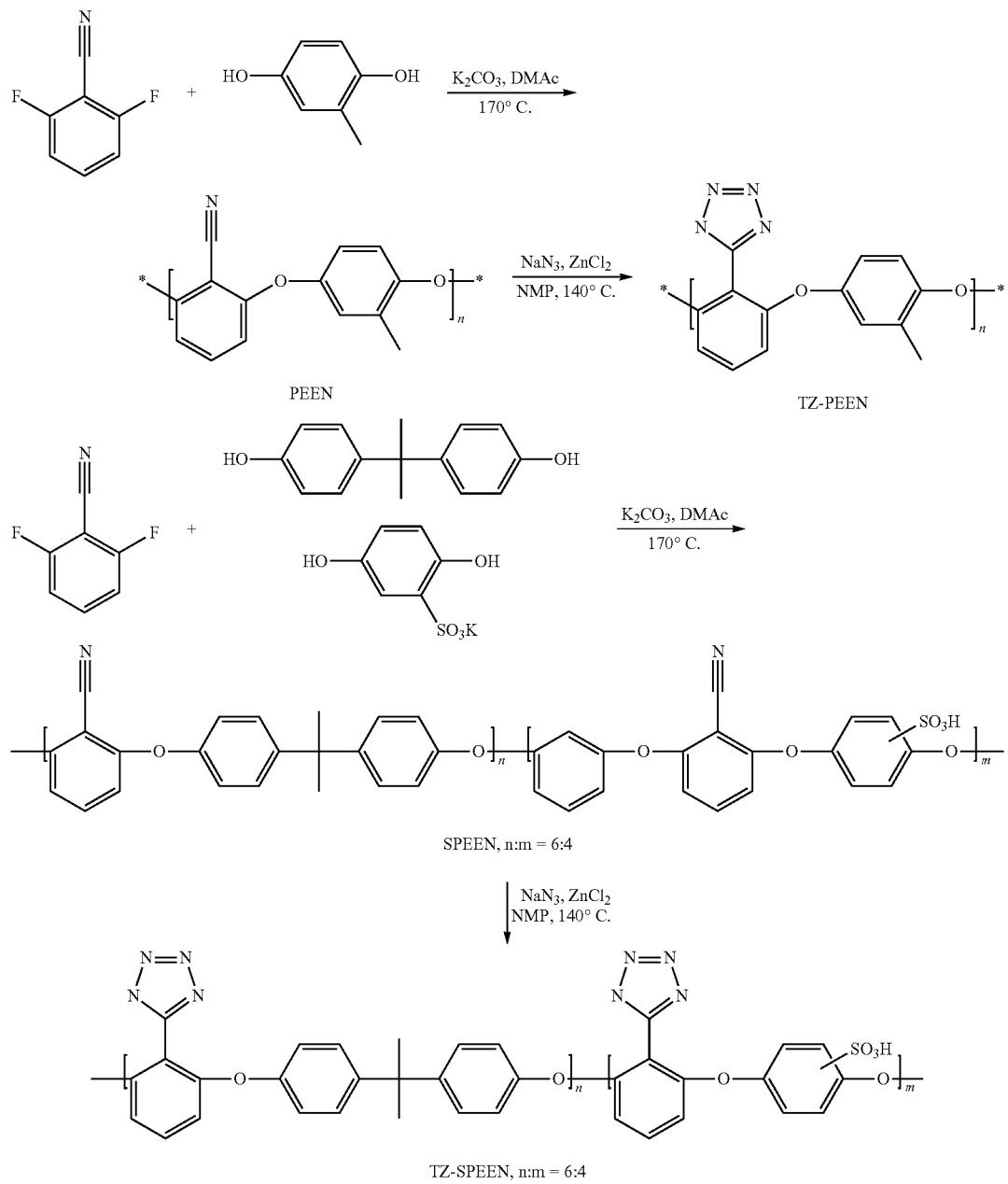

Although n:m in TZ-SPEEN was given as 6:4 in Scheme 1 as a non-limiting example, the ratio is not limited as long as n+m=1 is satisfied.

When fully substituted, PEEN show a very high density of functional groups, while SPEEN has a slightly lower tetrazole density and an additional sulfonic acid group.

The acid group was proposed to improve the conductivity of membranes with a low PA doping level.

Characterization of PEEN and SPEEN was done by NMR spectroscopy.

In order to assign the peaks of SPEEN, a polymer without the hydroquinonesulfonic acid monomer (P1) and another polymer without bisphenol A (P2) were synthesized and characterized.

It was found that the protons in meta-position to the nitrile group appear at 6.59/6.61 ppm in P1, and are split up into signals at 6.91/6.93, 6.77/6.79, 6.63/6.65, 6.48/6.51 and 6.39/6.41 in P2, reflecting the 3 possible triads (503H can be ortho or meta to benzonitrile) and the spatial orientation of the sulfonic acid groups.

While the polymerization reactions easily lead to membrane-forming polymers, the cycloaddition with azide is very sluggish and reactions need to be run for several days.

Among the tested conditions shown in Table 1, the highest conversion of the nitrile groups was achieved when the reactions were run at 140° C. for 6 days in normal (not anhydrous) NMP with zinc chloride as a catalyst (—CN: $ZnCl_2$:$NaN_3$=1:4:4).

TABLE 1

(reaction conditions tested for PEEN; reaction time = 6 days)

| Test conditions | Temperature (° C.) | Solvent | Catalyst | Conversion of nitrile group | Membrane property |
|---|---|---|---|---|---|
| 1 | 120 | Anhydrous NMP | $ZnCl_2$ | 25% | Not casted |
| 2 | 140 | Anhydrous NMP | $ZnCl_2$ | 50% | Flexible |
| 3 | 160 | Anhydrous NMP | $ZnCl_2$ | 60% | Brittle |
| 4 | 140 | NMP | $ZnCl_2$ | 70% | Flexible |
| 5 | 140 | NMP | $AlCl_3$ | 30% | Not casted |

The same reaction conditions were also applied to SPEEN, reaching a nitrile group conversion of about 80% for TZ-SPEEN.

Because the highest turnover reached was only around 70% for TZ-PEEN and around 80% for TZ-SPEEN, the NMR spectra of the tetrazolated polymers were very complex and did not allow a detailed characterization. Nevertheless, a new multiplet appearing at 6.96/6.98 ppm probably stems from the protons in meta-position to the tetrazole.

ATR FT-IR spectroscopy gave more information.

The intensity of the nitrile peaks at 2233 cm$^{-1}$ (PEEN) and 2235 cm$^{-1}$ (SPEEN) decreased with proceeding tetrazolization.

In addition, the bands around 1600 cm$^{-1}$ are slightly broadened and shifted to higher wave numbers. This indicates the appearance of a new band in this region, since N=N bonds of tetrazoles were reported to give signals around 1600 cm$^{-1}$.

Comparison of the integral areas of the nitrile bands ($A_{CN}$) and the bands around 1030 cm$^{-1}$ as internal standard ($A_{standard}$) allowed calculation of the degree of nitrile conversion, according to the following equation:

$$\text{Conversion } [\%] = 100 \times [(1-(A_{CN}/A_{standard}))/(A_{CN}/A_{standard})]. \quad \text{[Equation 3]}.$$

Density Functional Theory (DFT) Calculations

Figure 2A:
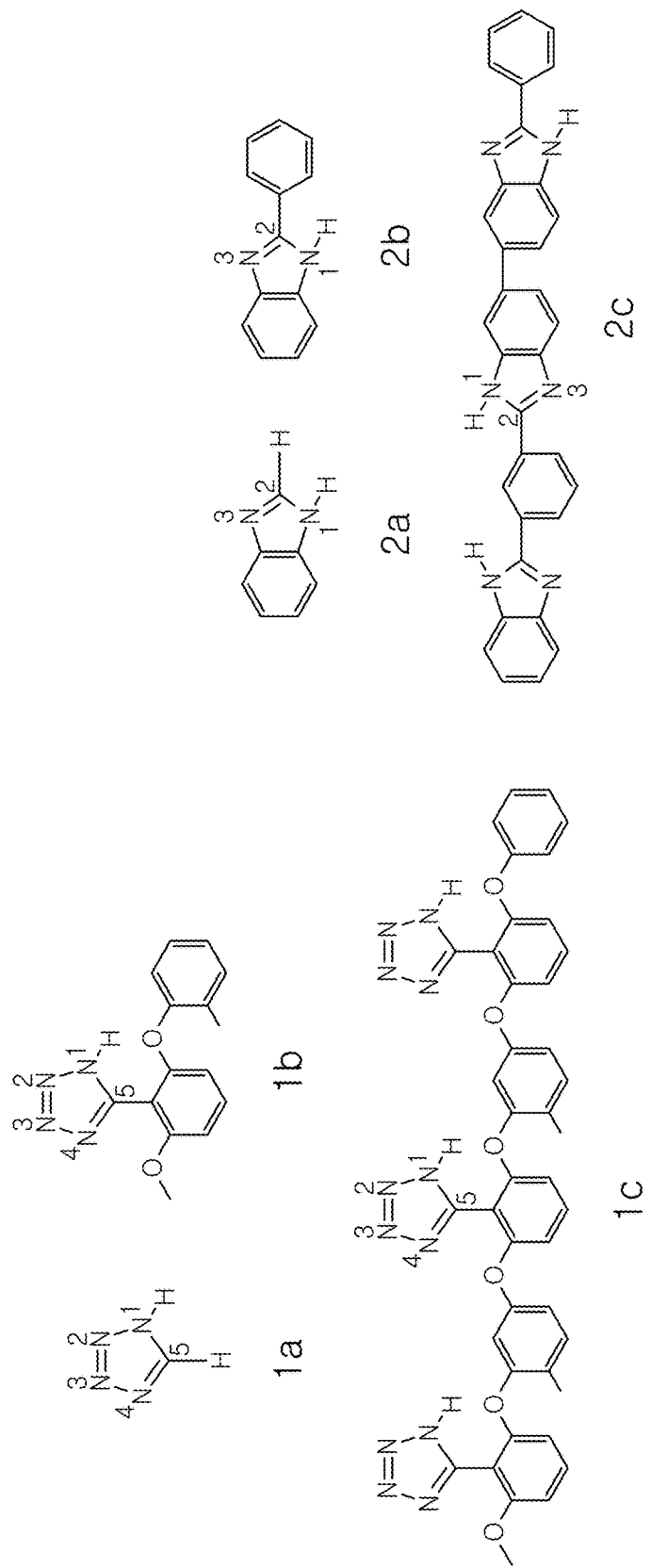
FIG. 2A shows a chemical structure for pristine form.
Figure 2B:
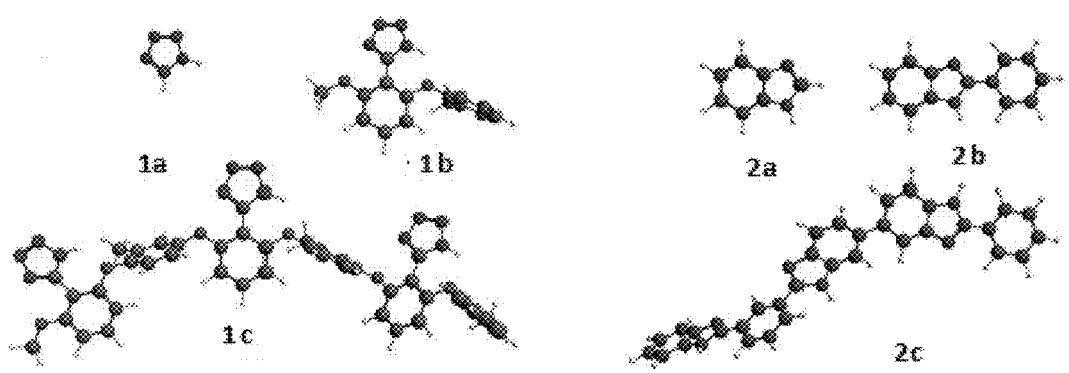
FIG. 2B shows an optimized geometry for pristine form.
Figure 2C:
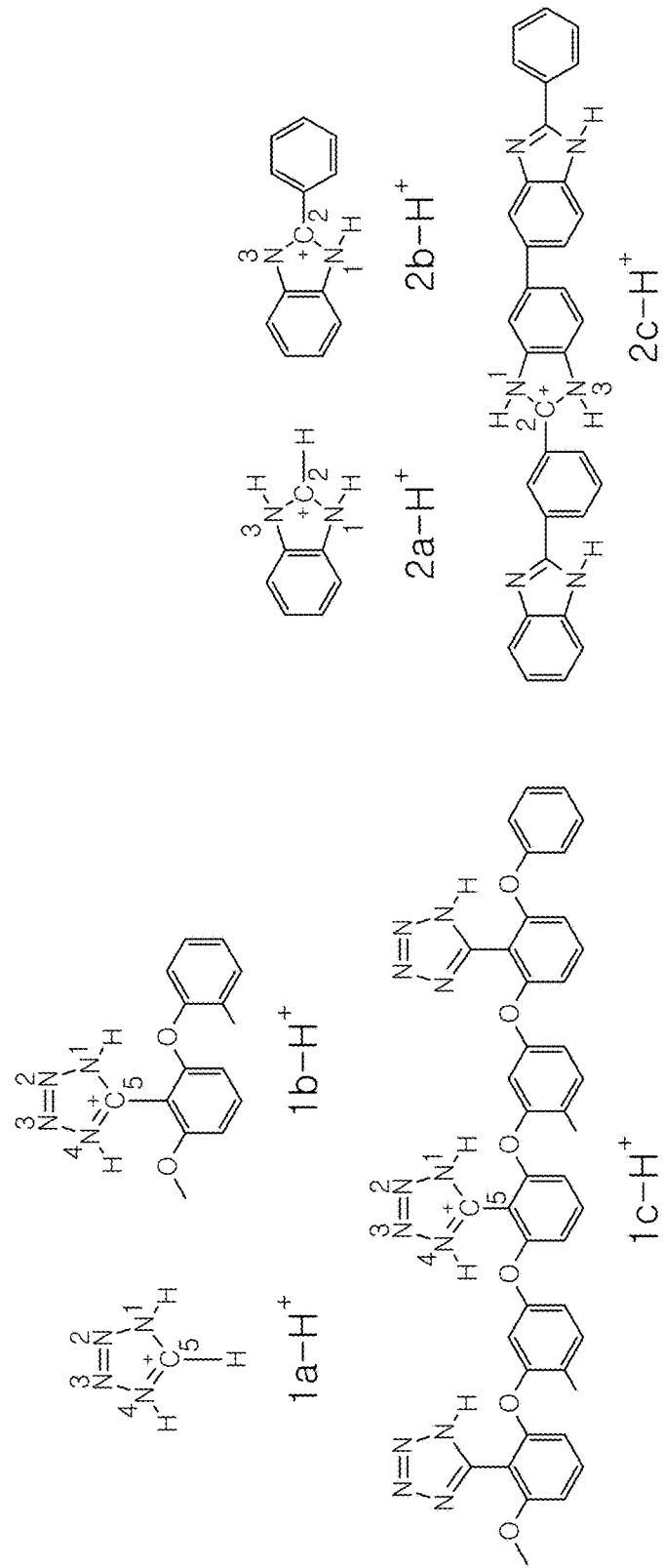
FIG. 2C shows a chemical structure for protonated form and FIG. 2D shows an optimized geometry for protonated form.
Figure 2D:
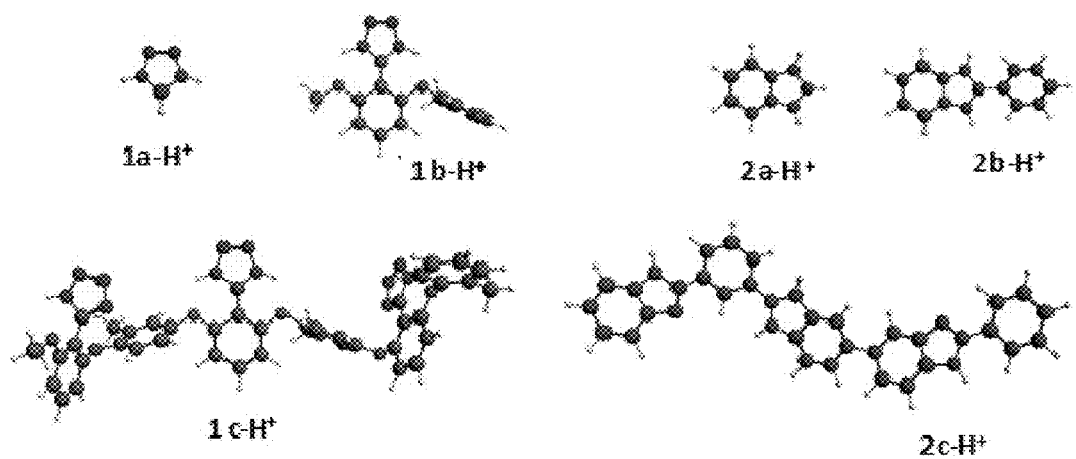

The model systems considered in theoretical DFT calculations are shown in FIGS. 2A-2D. FIG. 2A shows a chemical structure for pristine form, FIG. 2B shows an optimized geometry for pristine form, FIG. 2C shows a chemical structure for protonated form and FIG. 2D shows an optimized geometry for protonated form.

Referring to FIGS. 2A-2D, starting from the tetrazole structure (1a), a model was further considered based on the single repeating unit motif of TZ-PEEN ('monomer' 1 b), saturated by a hydrogen atom (added on phenyl) and a methyl group (linked to the ether oxygen atom).

Finally, the largest TZ-PEEN model contains three repeating units ('trimer' 1c, saturated as in the case of 'monomer'). In such a 'trimeric' model as 1c, the interactions of the central repeating unit with the neighbors are taken into account.

Comparison of the results obtained for the models 1a, 1 b and 1c allows for discussion of the influence of the ether groups on the properties of the tetrazole fragment, as well as the influence of the neighboring repeating units.

The FBI models, used for comparison, were constructed accordingly.

Specifically, benzimidazole 2a and 2-phenylbenzimidazole 2b were consider as 'monomers' and the structure 2c was considered as the 'trimeric' model (see FIGS. 2A-2D).

It should be noted, however, that the structure 2b does not directly correspond to the FBI repeating unit which contains two benzimidazoles linked by the phenyl fragment.

The tetrazole-based models 1 b and 1c include one and three possible protonation sites, respectively. Thus, the PBI-models 2b and 2c were constructed in such a way that they comprise correspondingly one and three protonation sites.

The protonated systems derived from the neutral models are shown in the bottom part of FIG. 2C and FIG. 2D.

In all the cases single protonation was considered and in the case of the 'trimeric' models the protonation of the central unit was considered only.

In the tetrazole-based structures, 1a-H$^+$, 1b-H$^+$ and 1c-H$^+$, protonation of each of the tetrazole-nitrogen atoms was considered.

It should be pointed out that for unsubstituted tetrazole protonation of the N4 and N3 positions is facile, with a negligible energetic preference of the latter (by about 0.1 kcal/mol).

However, in 1b-H$^+$ and 1c-H$^+$ the protonation of N4 is preferred (by about 8.1 kcal/mol and 7.6 kcal/mol, respectively). Therefore, in FIGS. 2A-2D only the structures protonated at N4 position are shown.

In the PBI-based structures, 2a-H$^+$, 2b-H$^+$ and 2c-H$^+$, the proton is attached to the corresponding N3 atom.

The optimized minimum energy structures of the neutral and the protonated models are shown in FIG. 2B and FIG. 2D, respectively.

Concerning the optimized geometries of the polymer models, it is worth emphasizing that in all the structures the tetrazole and the phenyl rings are almost coplanar in the central unit with the deviation of the torsion angle by about 1° to 5°.

The planar arrangement is stabilized by the interaction between the proton on the nitrogen atom and the ether oxygen atom(s) (intramolecular hydrogen bonding) (the (N—H)—O distance varies between 1.99-2.02 Å for different structures).

Figure 3A:
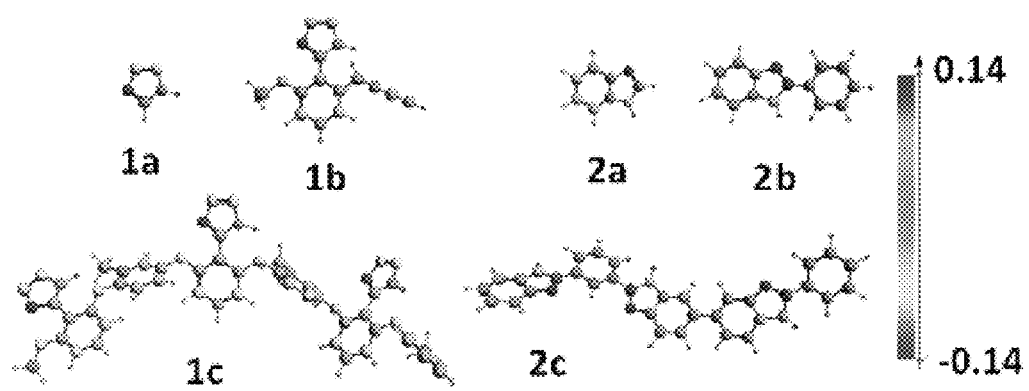
FIG. 3A shows the color representation of Hirshfeld atomic charges for the compounds considered in DFT analysis according to an example embodiment. The color scale is shown in the right side. The blue color corresponds to the highest positive charge and the red color corresponds to the highest negative charge.
Figure 3B:
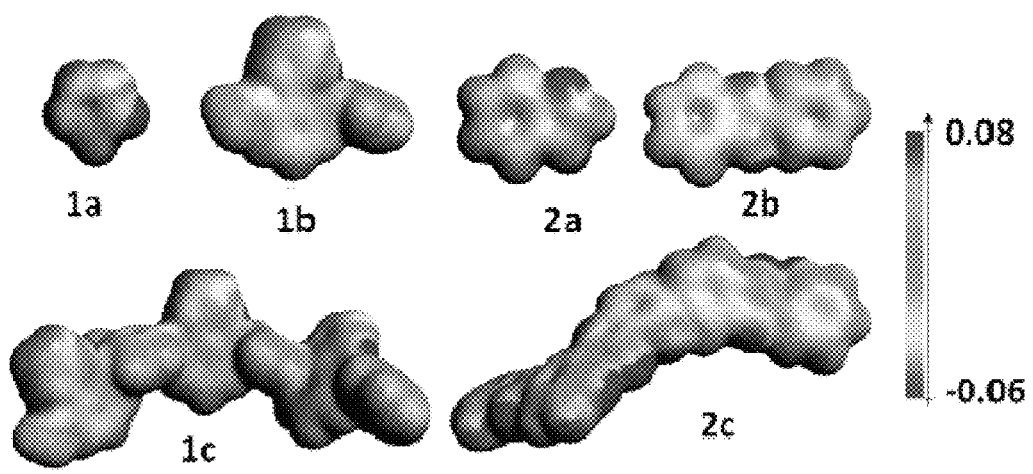
FIG. 3B shows the molecular electrostatic potential (MEP) color-coded at electron density isosurface ($\rho$=0.002 a.u.) according to an example embodiment. The color scale is shown in the right side. The blue color corresponds to the highest positive MEP value and the red color corresponds to the lowest MEP value.

FIG. 3A shows the color representation of Hirshfeld atomic charges for the compounds considered in DFT analysis in this example. The color scale is shown in the right side. The blue color corresponds to the highest positive charge and the red color corresponds to the highest negative charge. FIG. 3B shows the molecular electrostatic potential (MEP) color-coded at electron density isosurface (ρ=0.002 a.u.) according to an example embodiment. The color scale is shown in the right side. The blue color corresponds to the highest positive MEP value and the red color corresponds to the lowest MEP value.

Figure 4:
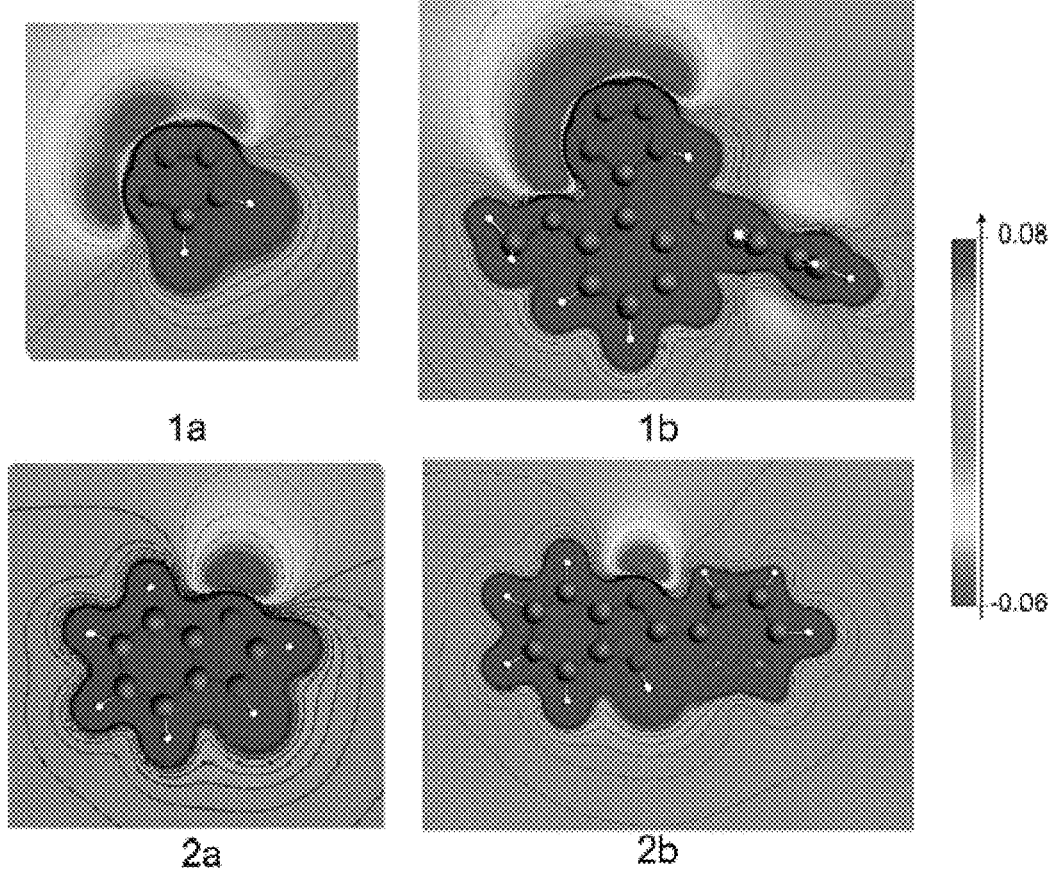
FIG. 4 shows the contour maps of MEP for the neutral compounds plotted in the plane containing heterocyclic ring in DFT analysis according to an example embodiment. The color scale is shown in the right side. The blue color corresponds to the highest positive MEP value and the red color corresponds to the lowest MEP value.

To describe in more detail, charge distribution in the neutral systems has been characterized by Hirshfeld atomic charges (FIG. 3A) and the molecular electrostatic potential, MEP (FIG. 3 B, FIG. 4 and Table 2).

For all the tetrazole-based systems the most negative atomic charge (red color in FIGS. 3A-3B) is observed on N4 atom.

For PBI-systems on the corresponding atom is observed on N3 (see FIG. 3-A).

The picture emerging from atomic charges is consistent with the MEP distribution.

For tetrazole-based systems MEP exhibits negative region extending over N2-N3-N4 part of the ring. For the PBI-systems, it is shown in the vicinity of the corresponding N3 atom.

Thus, it may be predicted that for tetrazole-systems the proton/positive charge will be stabilized in a relatively extended, wide negative MEP region, in proximity of N2-N3-N4).

It is worth pointing out, however, that the details of the MEP distribution change when comparing simple, unsubstituted tetrazole molecule and the tetrazole ring in the monomer/polymer models.

FIG. 4 shows the contour maps of MEP for the neutral compounds plotted in the plane containing heterocyclic ring in DFT analysis in this example. The color scale is shown in the right side. The blue color corresponds to the highest positive MEP value and the red color corresponds to the lowest MEP value.

To describe further referring to FIG. 4, the depth of the minima increases as an influence of the ether-oxygen atoms (FIG. 4, Table 2).

Also a relative depth of the minima in the vicinity of N2, N3, N4 atoms changes. For tetrazole, the N3-minimum is slightly deeper, while for 1b, and 1c, the N4-minimum is the deepest. Thus, it may be expected that the preferred protonation site changes in the polymer (N4) compared to unsubstituted tetrazole (N3).

In the FBI-system, the trend in MEP is opposite, when comparing the unsubstituted benzimidazole 2a and the polymer models 2b and 2c. Here, in the polymer models electrostatic potential becomes less negative than in the simple benzimidazole as an influence of the positive MEP in plane of the introduced phenyl ring (originating mostly from hydrogen atoms).

A comparison of the experimental and previously calculated $pK_a$ values shows that imidazole will be mainly protonated in the presence of phosphoric acid (PA) ($pK_a$ (PA)= 2.15, $pK_a$ (imidazole)=14.52, $pK_a$ (imidazolium)=6.95). However, tetrazole has a $pK_a$ of 4.90, and tetrazolium ion has a $pK_a$ of −2.68. Therefore, only a fraction of the tetrazole units will be protonated to tetrazolium ions by phosphoric acid (PA).

The calculated protonation energies for all the considered models are collected in Table 2.

Table 2 shows the minimum values of the molecular electrostatic potential, $V_{min}$, and the protonation energies, $\Delta E_p$, in kcal/mol.

TABLE 2

| Systems | $V_{min}^2$ | $\Delta E_p^1$ |
|---|---|---|
| 1a | −47.1 (N$_4$) −47.7 (N$_3$) | −206.43 (−37.59) |
| 1b | −63.4 (N$_4$) −60.2 (N$_3$) | −240.48 (−71.64) |
| 1c | −56.5 (N$_4$) −55.2 (N$_3$) | −245.53 (−76.69) |
| 2a | −58.4 (N$_3$) | −233.78 (−64.94) |
| 2b | −53.3 (N$_3$) | −240.37 (−71.53) |
| 2c | −54.6 (N$_3$) | −246.73 (−77.89) |

[1] Reaction energy for $X + H^+ \rightarrow XH^+$ and for $X + H_3O^+ \rightarrow XH^+ + H_2O$ (in brackets).
[2] Two values describe the minima in the vicinity of the N3 and N4 nitrogen atoms.

The results show that, when comparing the unsubstituted tetrazole 1a with the benzimidazole 2a, the protonation is more stabilized for the latter (by about 27 kcal/mol).

The protonation is facilitated in the 'monomers' compared to small molecules, and further in the 'timers'.

However, this effect is much stronger for the tetrazole-based models than for FBI. As a result, the protonation energies for tetrazole- and PBI-'monomers' are comparable (1b vs. 2b). For the corresponding 'timers' the preference of FBI was only about 1 kcal/mol (1c vs. 2c).

These effects clearly originate from the changes in MEP discussed earlier (for tetrazole MEP is deeper for 1b and 1c than for 1a, while for FBI MEP is deeper for 2a than 2b and 2c).

In other words, while the calculated protonation energies of the tetrazole 1a and the imidazole 2a reflect qualitatively the lower $pK_a$ values of tetrazole, calculations predict that the introduction of 2,6-ether-substituted phenyl groups in the C5-position of tetrazole significantly increases the $pK_a$ values of such tetrazole groups, into the range of imidazole systems.

This can be understood by the predicted planar structure of these systems, which allows for resonance stabilization over the phenyl ring. Therefore, while tetrazole-based polymers may not interact well enough with phosphoric acid (PA) to be doped efficiently, systems containing 2,6-ether-substituted phenyl groups in the C5-position of tetrazole may be very attractive systems for PA-doped polymers.

Figure 5A:
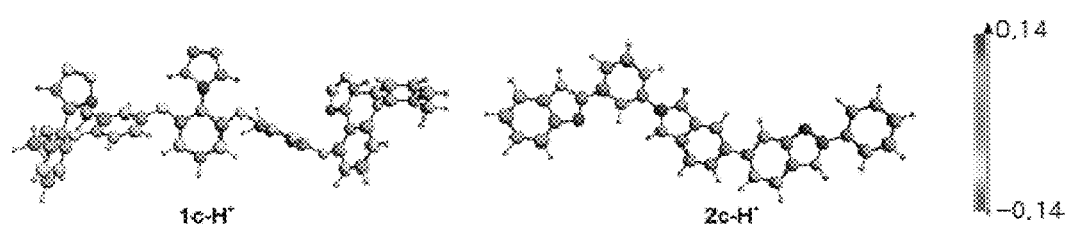
FIG. 5A shows the color representation of Hirshfeld atomic charges for the protonated trimeric compounds considered in DFT analysis according to an example embodiment. The color scale is shown in the right side. The blue color corresponds to the highest positive charge and the red color corresponds to the highest negative charge.
Figure 5B:
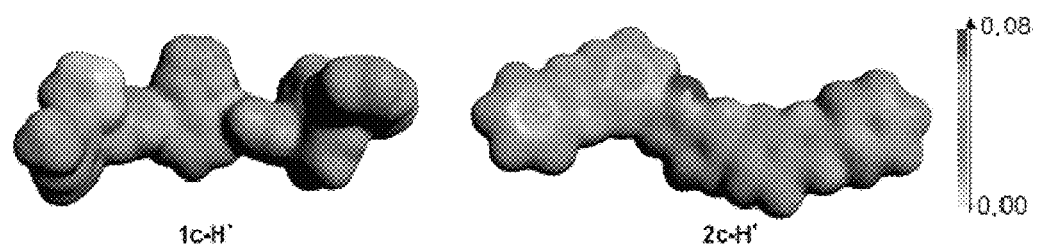
FIG. 5B shows the molecular electrostatic potential (MEP) color-coded at electron density isosurface ($\rho=0.002$ a.u.) according to an example embodiment. The color scale is shown in the right side. The blue color corresponds to the highest positive MEP value and the yellow color corresponds to the lowest MEP value.

Finally, charge distribution in the protonated systems is presented in FIGS. 5A-5B.

FIG. 5A shows the color representation of Hirshfeld atomic charges for the protonated trimeric compounds considered in DFT analysis in this example. The color scale is shown in the right side. The blue color corresponds to the highest positive charge and the red color corresponds to the highest negative charge. FIG. 5B shows the molecular electrostatic potential (MEP) color-coded at electron density isosurface (ρ=0.002 a.u.) according to an example embodiment. The color scale is shown in the right side. The blue color corresponds to the highest positive MEP value and the yellow color corresponds to the lowest MEP value.

The results clearly show that the positive charge is strongly localized on the protonated units (the carbon C2 and NH atoms).

Thus, it may be expected that further protonation on the nonprotonated polymer units should be facile. It should be pointed out that this effect may be of vital importance for proton conductivity.

Phosphoric Acid Uptake of Tetrazole-Containing Membranes

To test the phosphoric acid (PA) uptake of TZ-PEEN and TZ-SPEEN, dry membrane samples were immersed in 85% phosphoric acid (PA) solutions at 30, 80 and 120° C.

Figure 6A:
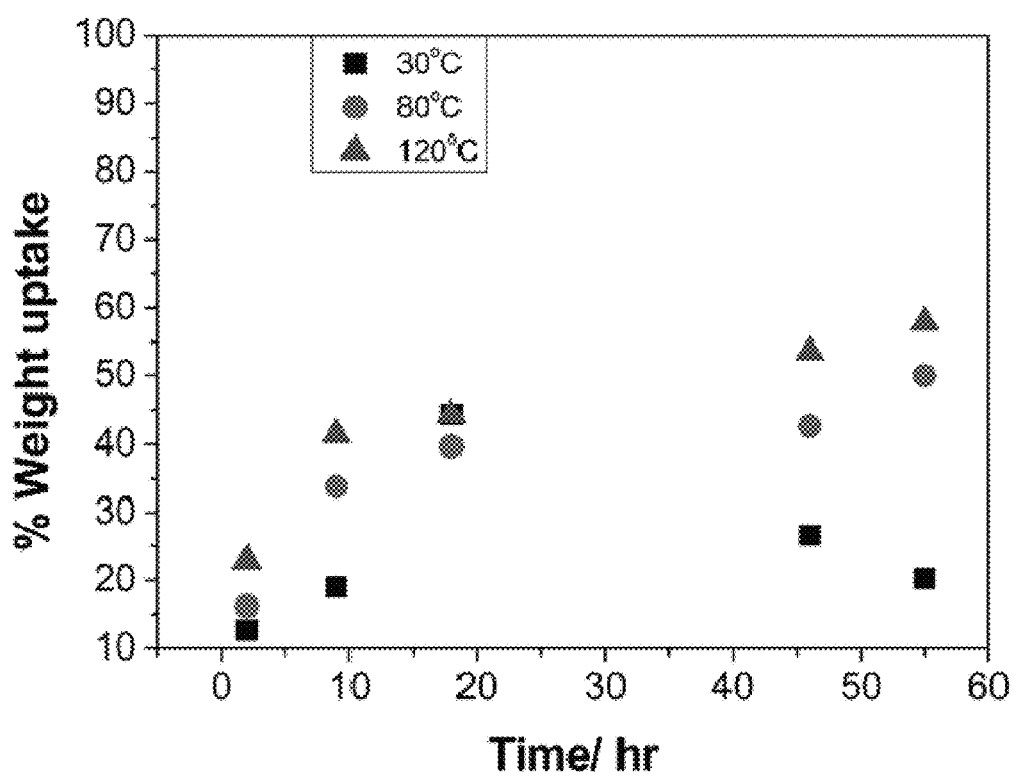
FIGS. 6A-6B show phosphoric acid (PA) uptake of a TZ-SPEEN membrane (FIG. 6A) and a TZ-PEEN membrane (FIG. 6B) according to an example embodiment in 85% phosphoric acid (PA) solutions at different temperatures.
Figure 6B:
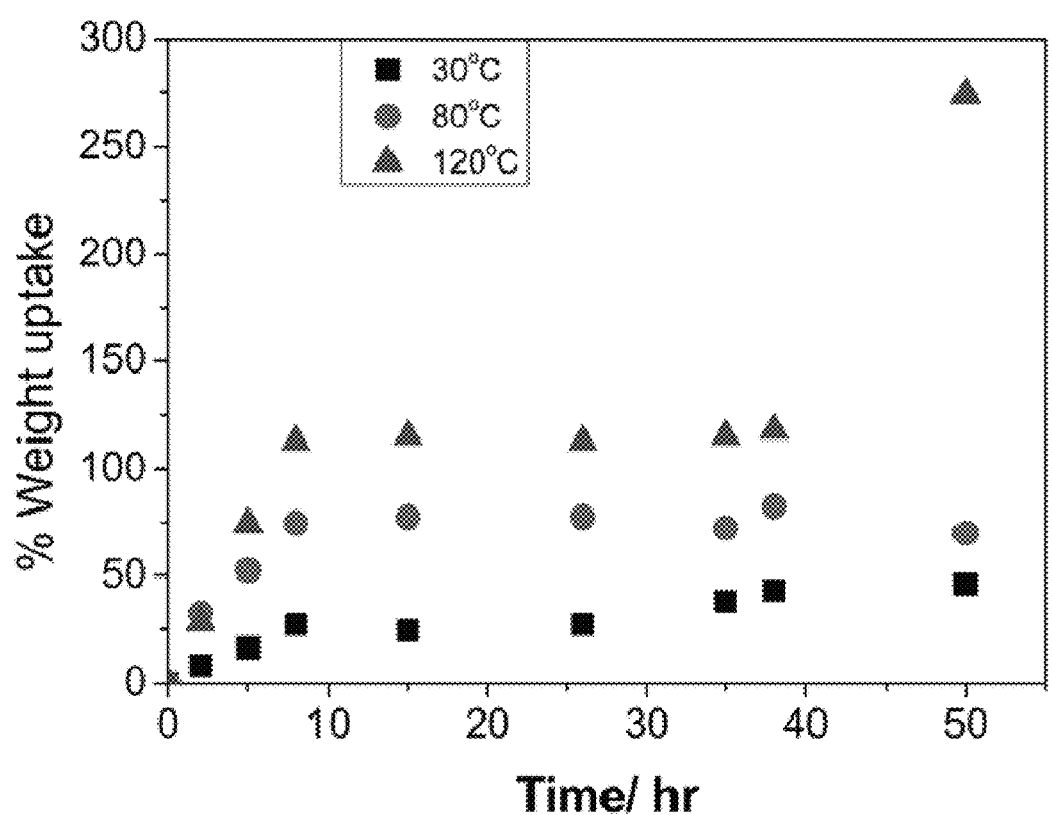

Every 2-3 hours, the samples were weighed and the wet weight (gross PA uptake) was noted (see FIGS. 6A-6B).

FIGS. 6A-6B show phosphoric acid (PA) uptake of the TZ-SPEEN membranes (FIG. 6A) and the TZ-PEEN membranes (FIG. 6B) in 85% phosphoric acid (PA) solutions at different temperatures.

In general, the TZ-PEEN membranes absorbed more phosphoric acid than the TZ-SPEEN membranes.

While the TZ-PEEN membranes reached an equilibrium value after about 10 hours, independent of the temperature, the TZ-SPEEN membranes rapidly increased in weight until about 10 hours, and then continued to absorb phosphoric acid at a lower rate. At 30° C., the phosphoric acid (PA) uptake decreased again after about 20 hours.

This unexpected behavior suggests that the membrane is not stable under acidic conditions and undergoes some chemical or morphological changes, which seem to be compensated by the strong swelling forces at elevated temperatures.

The phosphoric acid (PA) uptake of TZ-PEEN suddenly increased after 50 hours, up to about 270%, rendering the membrane into a sticky, gel-like membrane.

Therefore, further characterizations of phosphoric acid-doped membranes were done with membranes doped only for 10-15 hours at 120° C., giving access to doping levels of about 110 and 50 wt % for TZ-PEEN and TZ-SPEEN, respectively.

It was reported for PBI membranes that the water contents of the absorbed phosphoric acid is roughly in the range of 15% of the weight gain and can be determined by drying the membranes in the vacuum at 110° C.

Drying of the doped membranes showed that the acid inside of the membranes had a water concentration of 24% and 14% for the TZ-PEEN membrane and the TZ-SPEEN membrane, respectively.

A comparison of the equilibrium acid doping level in 85 wt % phosphoric acid (PA) at room temperature revealed that the TZ-PEEN membrane and the meta-PBI membrane absorbed 0.5 mol and 4.7 mol phosphoric acid per mole of heterocycles, respectively (corrected for the 24% and 14% water in the absorbed phosphoric acid).

The PBI membrane shows higher affinity to phosphoric acid than the TZ-PEEN membrane.

Thermal Stability

The thermal stability of the phosphoric acid-doped and pristine membranes was investigated by thermal gravimetric analysis under nitrogen atmosphere at a heating rate of 10° C./min.

For the phosphoric acid-doped tetrazole membranes, the TZ-PEEN and TZ-SPEEN membranes were both doped at 120° C. for 15-20 hours.

Figure 7:
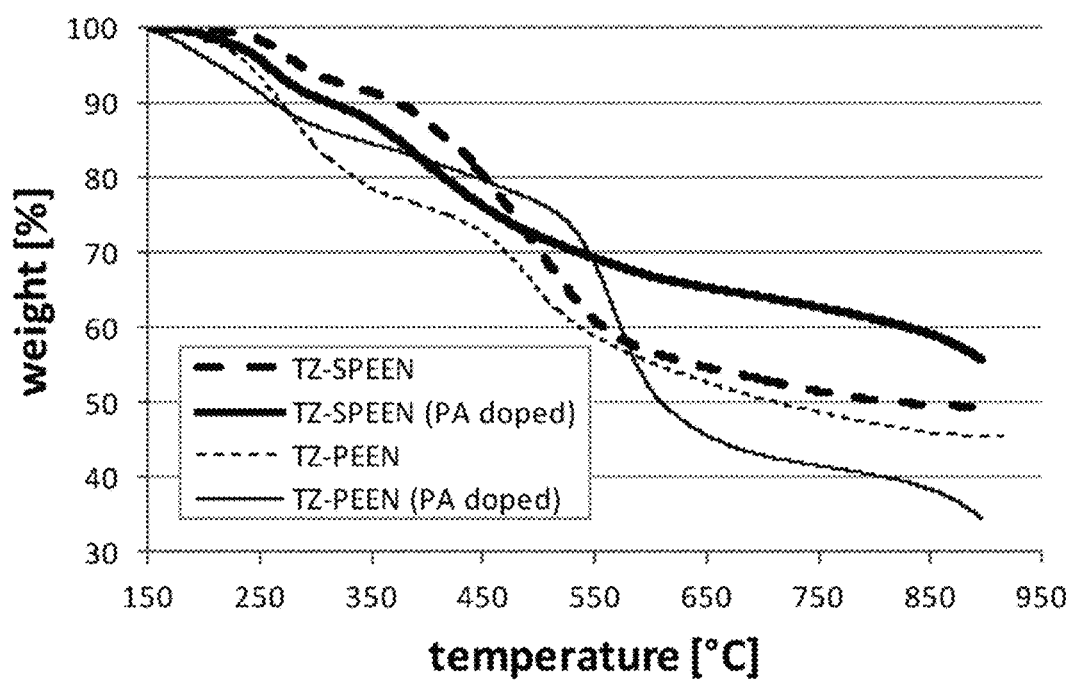
FIG. 7 shows the result of thermal analysis of tetrazole-containing membranes according to an example embodiment before and after phosphoric acid doping at 120° C. for 15-20 hours.

FIG. 7 shows the result of thermal analysis of the tetrazole-containing membranes before and after phosphoric acid doping at 120° C. for 15-20 hours.

As seen from FIG. 7, all the samples show two degradation steps.

5% weight loss was observed around 212° C. or higher. For the undoped TZ-PEEN and TZ-SPEEN membranes, 5% weight loss was observed at 229° C. and 286° C., respectively.

This result fulfills the minimum temperature requirement for high temperature fuel cells. The origin of the first degradation step around 200° C. is not clear. One possibility is residual water which could not be removed by pre-drying at 100° C. for 30 minutes, as water molecules are likely involved in intermolecular hydrogen bonding with the nitrogen atoms. Another possibility is related to the tetrazole moieties. For the 70%-tetrazolated TZ-PEEN membrane, loss of tetrazole would account for 19% weight loss, and loss of $HN_3$ (back reaction of the cycloaddition with azide) for 12%. Therefore, loss of the whole tetrazole group during thermal degradation is more probable.

On the other hand, the TZ-SPEEN membrane shows only half of the expected weight loss. This may indicate a stabilizing effect, e.g. ionic interaction, of the sulfonic acid groups. For the acid-doped samples, degradation includes dehydration of phosphoric acid under formation of phosphoric acid (PA) anhydrides.

Around 400° C., all the four samples showed degradation of the polymer backbone.

Mechanical Stability

The mechanical properties of the TZ-PEEN membrane and the TZ-SPEEN membrane and their dependence on the phosphoric acid (PA) uptake were analyzed by a universal testing machine.

Figure 8A:
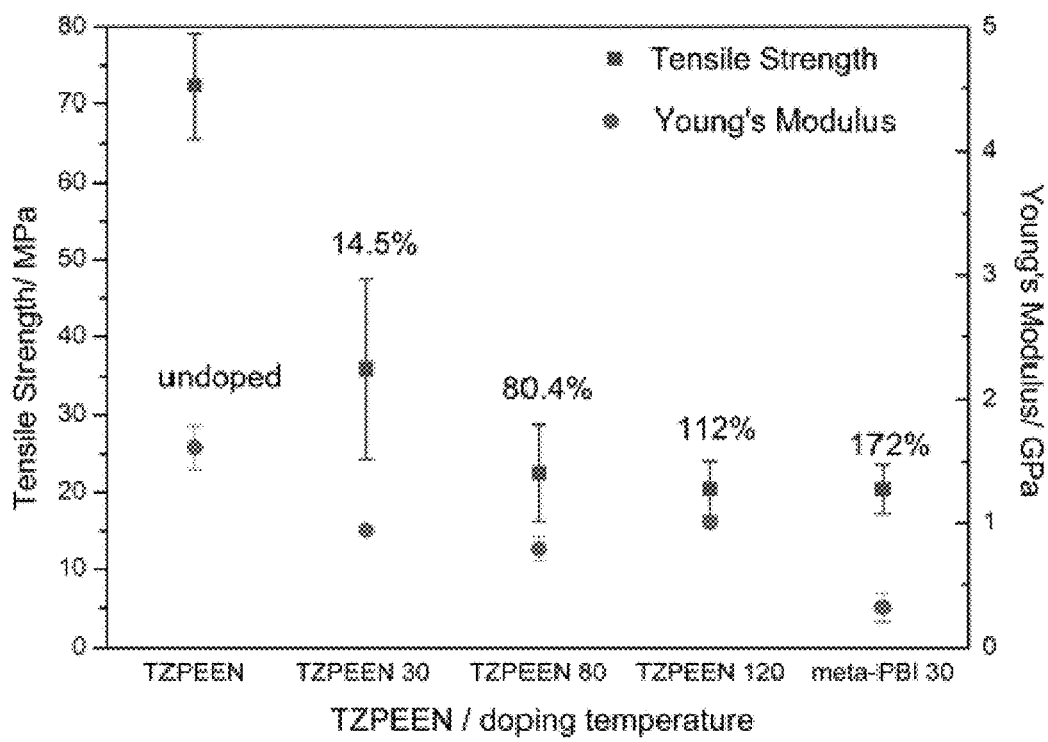
FIGS. 8A-8B show the tensile strength and Young's modulus of membranes with different PA uptake according to an example embodiment. Temperature: 27° C., relative humidity: 31% (FIG. 8A: TZ-PEEN, FIG. 8B: TZ-SPEEN).
Figure 8B:
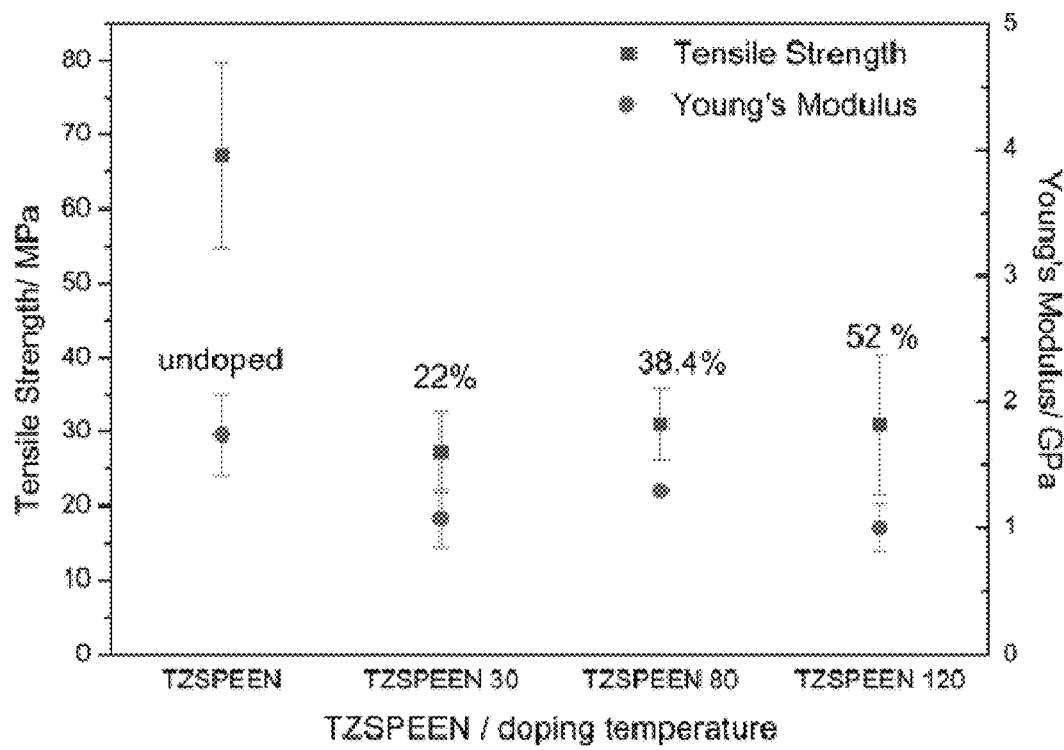

FIGS. 8A-8B show the tensile strength and Young's modulus of membranes with different PA uptake. Temperature: 27° C., relative humidity: 31% (FIG. 8A: TZ-PEEN, FIG. 8B: TZ-SPEEN).

As expected, both membranes showed the highest tensile strength and Young's modulus in the pristine form, 72 MPa and 1.5 GPa for TZ-PEEN, and 67 MPa and 1.7 GPa for TZ-SPEEN (see FIGS. 8A-8B).

Absorption of phosphoric acid decreased these values, down to a tensile strength of 20 MPa and a Young's modulus of 1 GPa for TZ-PEEN with a phosphoric acid uptake of 112%.

Yang et al. (Fuel Cells 2014, 14, 7-15.) reported a tensile strength of 25.8 MPa for meta-PBI with a phosphoric acid uptake of 180% ($M_w$ of PBI=37,000 g/mol).

And, Cho et al. (Eur. Polym. J. 2014, 58, 135-143) reported a tensile strength of 20.4 MPa for meta-PBI (45,000 g/mol) with a phosphoric acid uptake of 172%.

Considering the various factors influencing these measurements, water contents of the membranes, temperature and molecular weight of the polymer matrix, it can be seen that the tensile strength of the phosphoric acid-doped TZ-PEEN is just slightly lower or similar to that of commercial PBI.

The Young's moduli, however, are high for all the membranes, meaning that the membranes are very strong, but not tough, and therefore rather brittle. This could be an effect of low molecular weight.

Even though SEC measurements of SPEEN with PMMA standards indicated a $M_n$ of 21,100 and a $M_w$ of 50,900 g/mol, which are reasonably high for a membrane-forming polymer (analyzed by viscosity), this might still be too low, because different analytical methods were used.

TZ-SPEEN gave values of $M_n$=36,800 g/mol, and $M_w$=128,000. Its M peak ($M_p$=153,700) was more than twice lower in comparison to that of meta-PBI ($M_p$=339,400).

TZ-PEEN showed a $M_n$ of 28,400 g/mol and a very high $M_w$ value of 1,667,000 g/mol, due to the high molecular weight fraction being out of the calibration.

A reason for the brittle behavior of TZ-SPEEN could be also strong interactions of the tetrazole groups by hydrogen bonding, which may only be partially interrupted by protonation in the phosphoric acid-doped systems, because tetrazolium ions still possess unprotonated nitrogen atoms which act as hydrogen bond acceptors.

Furthermore, as discussed before, while imidazole is mainly protonated in the presence of phosphoric acid, the tetrazole units in TZ-PEEN and TZ-SPEEN are probably not fully protonated, due to the low $pK_a$ values of tetrazole and tetrazolium.

A lower level of protonation than observed for PBI is also indicated by the behavior of DMAc/0.5 wt % LiCl solutions, used as an eluent for SEC.

While the SEC curve of TZ-SPEEN does not show any dependence on the concentration of the polymer (from 0.5 to 12 mg/mL), this is not true in case of m-PBI. The chain of m-PBI collapses after a concentration of 2-4 mg/mL, forming compact structures with changed conformation, which results in the shift of SEC curves to higher elution volumes, i.e., lower molar masses.

Ionic Conductivity

For measuring in-plane proton conductivity, one TZ-SPEEN membrane sample and three TZ-PEEN samples cut from the same membrane were prepared by doping in 85 wt % phosphoric acid at 120° C. for 15-20 hours. After the doping, the membranes were dried at 110° C. for 5 hours in vacuum.

The membrane weight gains due to the doping acid were found to be of 81%, 109% and 112% (TZ-PEEN) and 58% (TZ-SPEEN).

The obtained membranes were dried before measuring the conductivity because water increases the conductivity of phosphoric acid-doped membranes.

Figure 9:
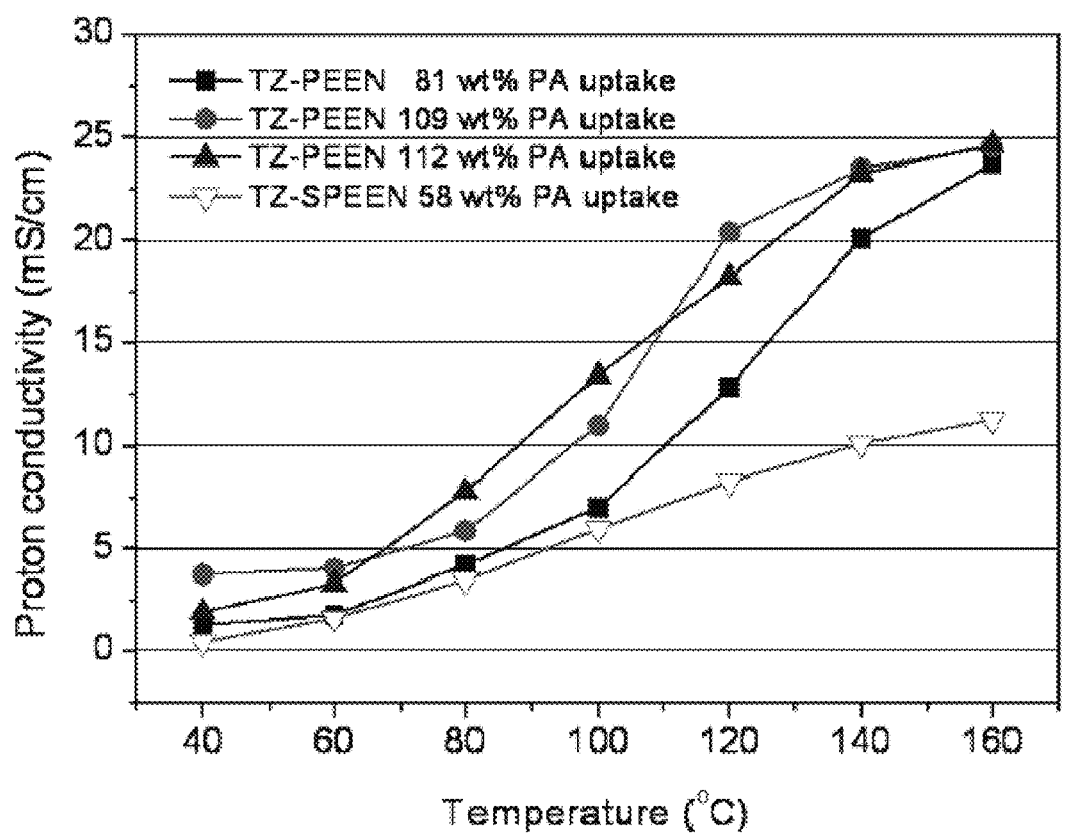
FIG. 9 shows the in-plane conductivity of phosphoric acid-doped TZ-PEEN and TZ-SPEEN membranes according to an example embodiment. Doping conditions: 120° C., 85 wt % phosphoric acid solution, 15-20 hours.

The proton conductivities of the phosphoric acid-doped tetrazole-based membranes were analyzed by electrochemical impedance spectroscopy (EIS) (see FIG. 9).

FIG. 9 shows the in-plane conductivity of phosphoric acid-doped TZ-PEEN and TZ-SPEEN membranes. Doping conditions were 120° C., 85 wt % phosphoric acid solution and 15-20 hours.

Compared with the proton conductivity of PA-doped meta-PBI with a weight gain of 172% during doping, the TZ-PEEN membranes showed much better values. At 160° C., the proton conductivity of PA-doped meta-PBI was reported as 14 mS/cm, while TZ-PEEN shows a conductivity of about 25 mS/cm, even though the phosphoric acid (PA) uptake is lower.

Considering the lower doping level of TZ-SPEEN in comparison to TZ-PEEN, it can be expected that the conductivity of TZ-SPEEN is much lower, and indeed it only reaches 12 mS/cm at 160° C., similar to that of the above-mentioned meta-PBI membrane, but at 30% of the acid uptake. These values are very low in comparison with meta-PBI doped with a PA uptake of about 350 wt % which showed a conductivity of 130-140 mS/cm at the same temperature (Fuel Cells 2014, 14, 7-15.), but since reduction of the phosphoric acid uptake increases the mechanical stability, it is necessary to reduce the phosphoric acid uptake.

FIG. 10 shows the Arrhenius plots of the PA-doped TZ-PEEN and TZ-SPEEN membranes in this example.

In the Arrhenius plot, the phosphoric acid-doped membranes show an inflection point at around 120° C. (see FIG. 10).

Between 60 and 100° C., however, a reasonably linear trend is observed ($R^2>0.99$), indicating that proton conduction in the phosphoric acid-doped TZ-PEEN and TZ-SPEEN has an activation energy in the range of 35 kJ/mol.

According to the literature, the activation energy for proton conduction in various PBI derivatives increases with increasing acid content, independent of the exact chemical structure of the polymer matrix, reaching about 45 kJ/mol at an acid content of 60%.

Figure 11:
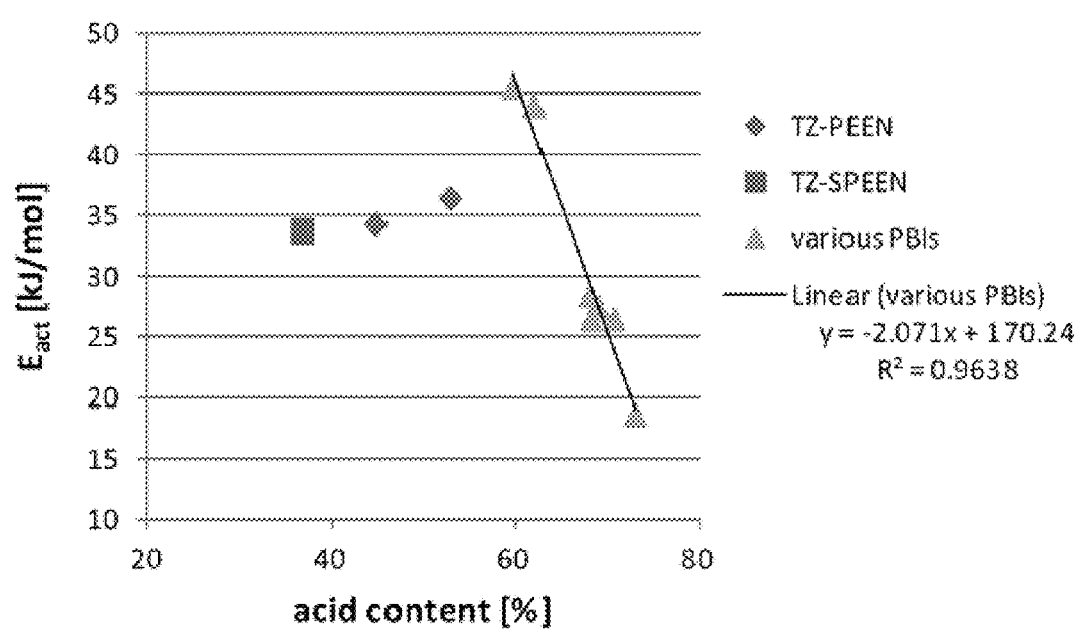
FIG. 11 compares the proton conduction activation energy of TZ-PEEN and TZ-SPEEN membranes according to an example embodiment (obtained from the linear regions in FIG. 10) and data from Asensio et al.

FIG. 11 compares the proton conduction activation energy of the TZ-PEEN and TZ-SPEEN membranes in this example (obtained from the linear regions in FIG. 10) and Comparative Example (Asensio et al.).

Even though the acid content in TZ-PEEN and TZ-SPEEN is lower (37-53%), the activation energies observed for the tetrazole-based membranes are much lower.

This suggests that proton conduction in the materials according to the embodiments of the present disclosure follows another mechanism (e.g., this could be a contribution of proton hopping involving the tetrazole rings).

In summary, it seems that the tetrazole-based membranes have an intrinsically higher conductivity, which can increase further if it is possible to increase the acid uptake without degrading the mechanical stability.

Fuel Cell Tests

To evaluate the performance of the tetrazole-based membranes in fuel cells, one TZ-SPEEN membrane (40-μm thick, MEA1) and two TZ-PEEN membranes (52- and 72-μm thick, MEA2 and MEA3) were doped for 20 hours at 50° C. (TZ-PEEN) and 120° C. (TZ-SPEEN), resulting in a weight gain of 46-51% (TZ-PEEN) and 56% (TZ-SPEEN). The membranes swelled mainly in the thickness direction during the doping, and were directly assembled into a fuel cell without additional drying steps.

Following the standard procedure, the TZ-SPEEN membrane (MEA1) was operated at a current density of 200 mA/cm$^2$ for activation. During the activation, redistribution of phosphoric acid typically increased the cell potential until a steady value was reached.

Figure 12:
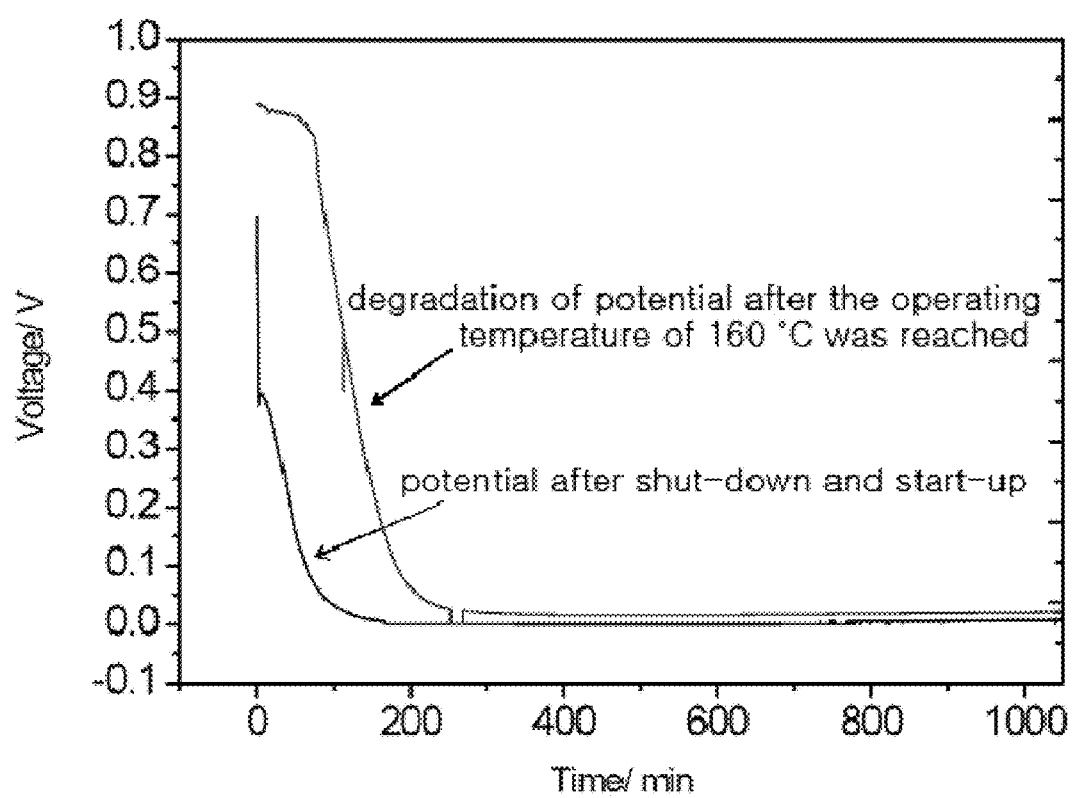
FIG. 12 shows the development of the potential at 0.2 Acm$^{-2}$ with time for a 40 μm-thick TZ-SPEEN membrane (MEA1), doped to a PA uptake of 56% (not dried), according to an example embodiment. The red curve shows the degradation of potential after the operating temperature of 160° C. was reached and the black curve shows the potential after shutdown and startup.

FIG. 12 shows the development of the potential at 0.2 Acm$^{-2}$ with time for the 40 μm-thick TZ-SPEEN membrane (MEA1), doped to a PA uptake of 56% (not dried). The red curve shows the degradation of potential after the operating temperature of 160° C. was reached and the black curve shows the potential after shutdown and startup.

Figure 13:
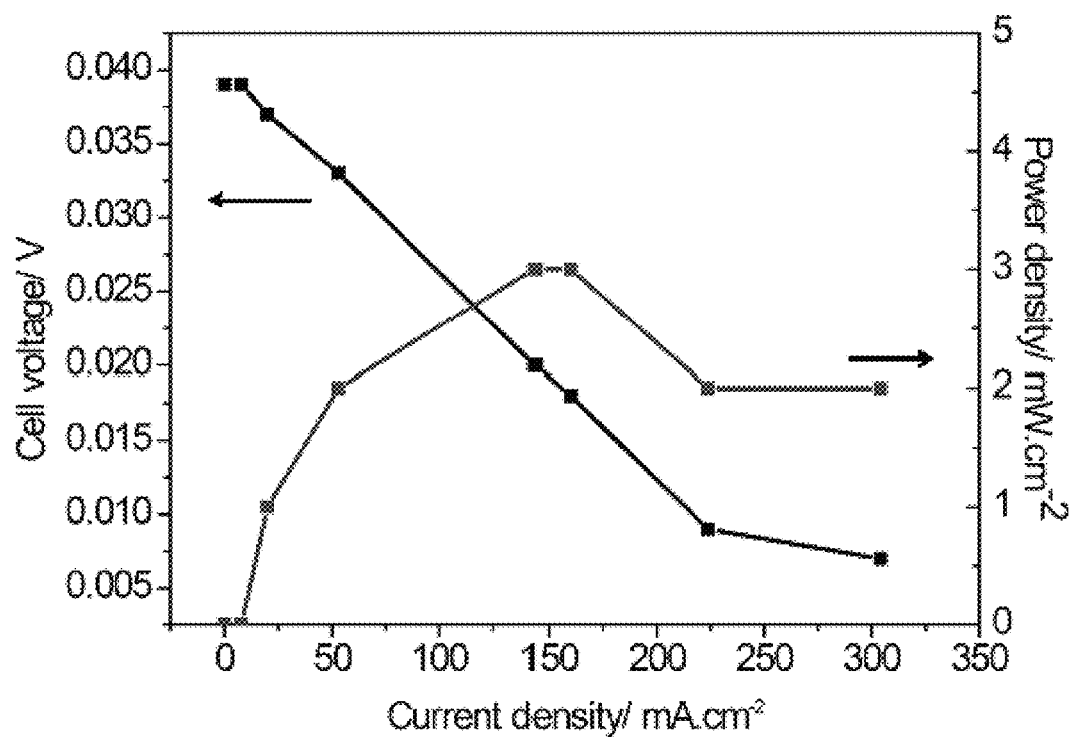
FIG. 13 shows the polarization curve and power density curve of a 40-μm thick, phosphoric acid-doped TZ-SPEEN membrane (MEA1) according to an example embodiment.

FIG. 13 shows the polarization curve and power density curve of the 40-μm thick, phosphoric acid-doped TZ-SPEEN membrane (MEA1).

Figure 14:
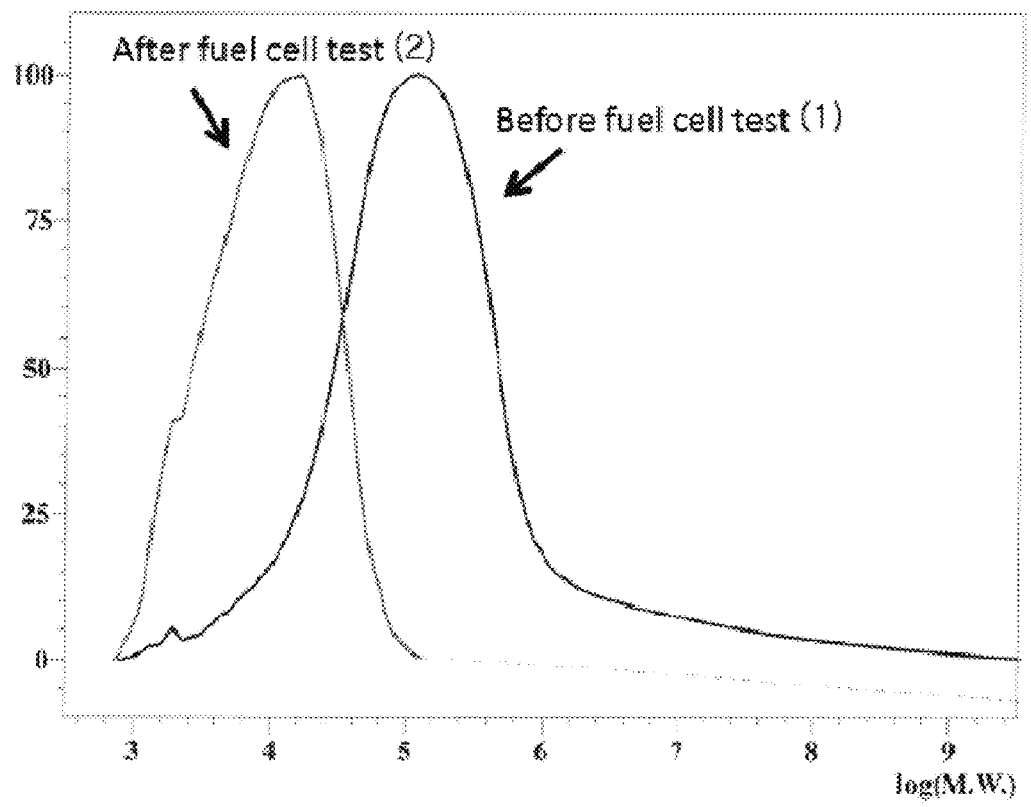
FIG. 14 shows the SEC curves of TZ-SPEEN before (1) and after (2) fuel cell test according to an example embodiment.

FIG. 14 shows the SEC curves of the TZ-SPEEN membrane before (1) and after (2) the fuel cell test.

For the TZ-SPEEN membranes, the potential decreased rapidly and already reached 0 V after 4 hours (red, upper curve in FIG. 12). The reason is the low acidic stability of bisphenol A that can lead to scission of the polymer main chain. SEC analysis of the membrane confirmed this hypothesis (see FIG. 14).

The TZ-PEEN membranes showed good fuel cell performance.

Both TZ-PEEN membranes showed stable fuel cell performance at 160° C. and a current density of 200 mA/cm$^2$, indicating that indeed the bisphenol A unit in TZ-SPEEN acts as a breaking point.

Bisphenol A-based polymer backbones are chemically unstable under the condition of phosphoric acid doping. In contrast, the aromatic polyether-based TZ-PEEN is chemically stable under the phosphoric acid doping condition and can be doped up to about 110% of phosphoric acid uptake.

Figure 15:
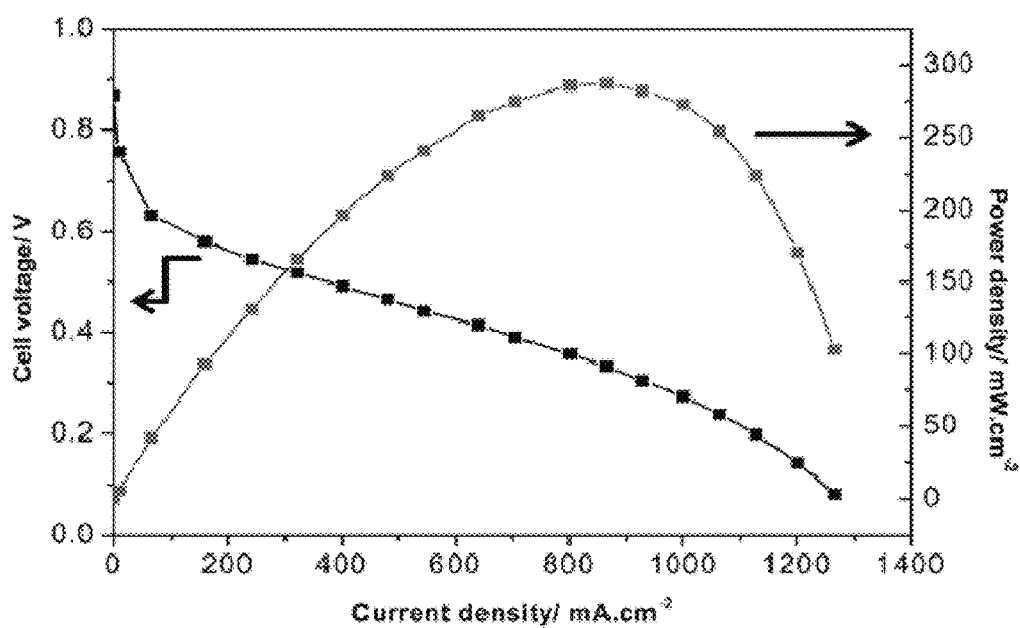
FIG. 15 shows the polarization curve and power density curve of an MEA2 membrane according to an example embodiment. The MEA2 membrane is a 52 μm-thick TZ-PEEN membrane, doped to a phosphoric acid uptake of 46% (wet). Cell temperature: 160° C.

After the activation, MEA2 (52 μm-thick TZ-PEEN membrane) showed a peak power density 287 mW/cm$^2$ and a potential at 200 mA/cm$^2$ of 558 mV (see FIG. 15).

FIG. 15 shows the polarization curve and power density curve of the MEA2 membrane. The MEA2 membrane was a 52 μm-thick TZ-PEEN membrane, doped to a phosphoric acid uptake of 46% (wet). Cell temperature was 160° C.

Figure 16:
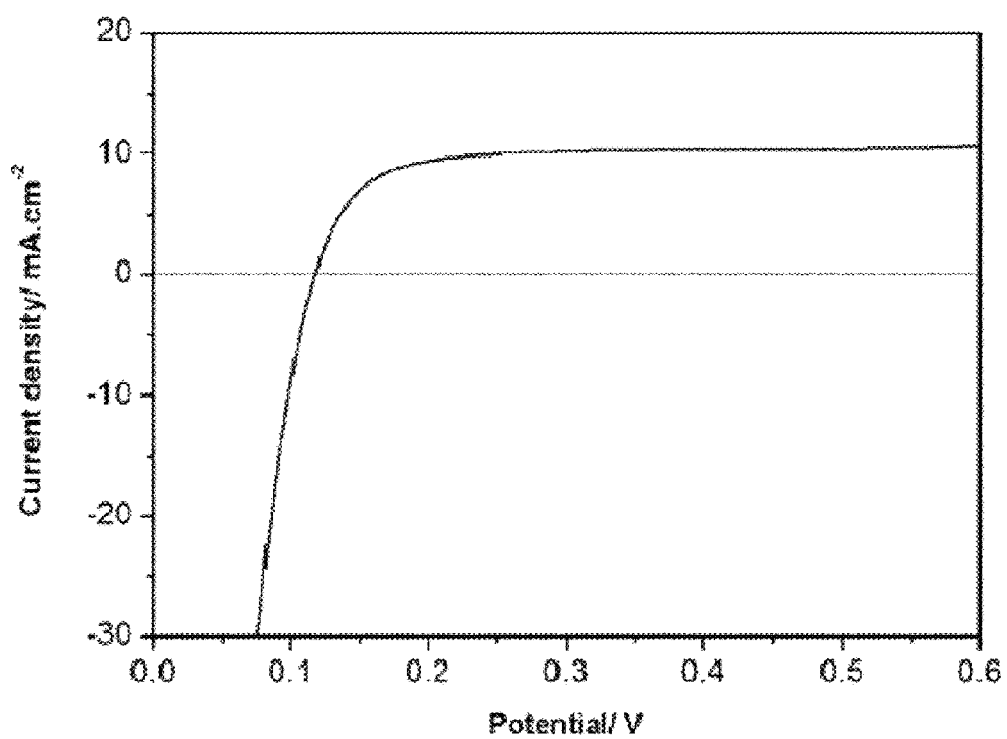
FIG. 16 shows the linear sweep voltammogram of a 52 μm-thick TZ-SPEEN membrane (MEA2), doped to a PA uptake of 46% (wet) according to an example embodiment, after 24 hours of operation (cell temperature: 160° C.).

FIG. 16 shows the linear sweep voltammogram of the 52 μm-thick TZ-SPEEN membrane (MEA2), doped to a PA uptake of 46% (wet), after 24 hours of operation (cell temperature: 160° C.).

Linear sweep voltammetry (FIG. 16) revealed that MEA2 was practically free of electric shorting (slope of the linear part ~0 1/Ωcm$^2$), and that the hydrogen crossover current was in the range of 10 mA/cm$^2$ (extrapolation to 0 V).

This crossover current density is too large for practical applications, but can be improved by increasing the membrane thickness and probably also by optimization of the membrane casting process.

Figure 17:
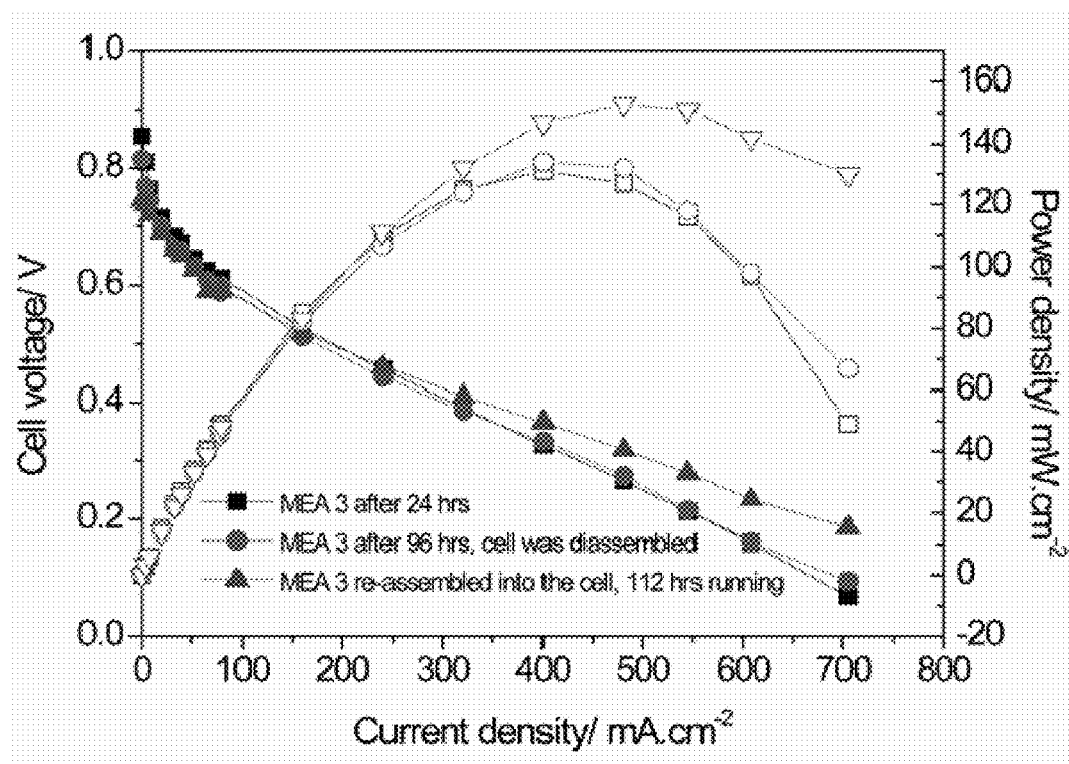
FIG. 17 shows the polarization curve and power density curve of an MEA3 membrane according to an example embodiment. The MEA3 membrane is a 72 μm-thick TZ-PEEN membrane, doped to a phosphoric acid uptake of 51% (wet). Cell temperature: 160° C.

The thicker membrane (MEA3; 72 μm-thick TZ-PEEN membrane) had a lower peak power density and potential at 200 mA/cm$^2$ than MEA2 (FIG. 17).

FIG. 17 shows the polarization curve and power density curve of the MEA3 membrane. The MEA3 membrane was a 72 μm-thick TZ-PEEN membrane, doped to a phosphoric acid uptake of 51% (wet). Cell temperature was 160° C.

Figure 18:
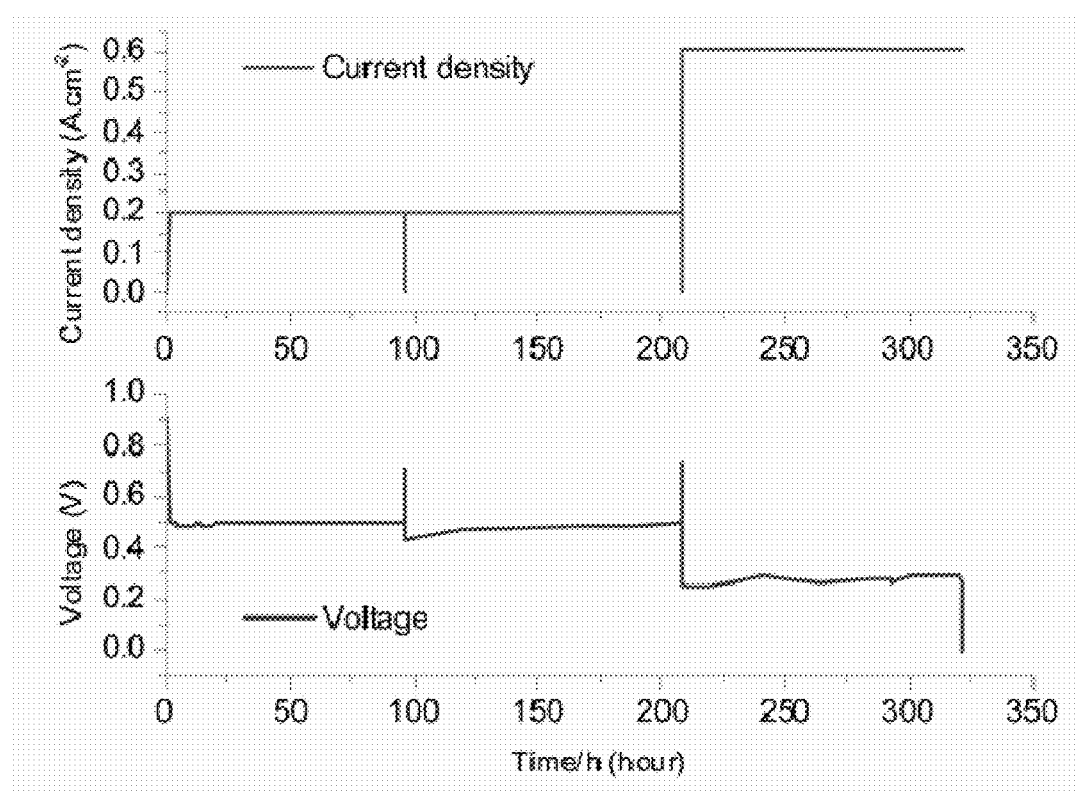
FIG. 18 shows the development of potential during the fuel cell test of an MEA3 membrane (72 μm-thick TZ-PEEN membrane) according to an example embodiment.

FIG. 18 shows the development of potential during the fuel cell test of the MEA3 membrane (72 μm-thick TZ-PEEN membrane). At 96 hours, the cell was disassembled and re-assembled. After 208 hours, the current density was increased to 0.6 A/cm$^2$, leading to a sudden failure around 325 hours. To describe in more detail, after 96 hours at constant current, the cell was disassembled to test another MEA. Then the MEA3 membrane was re-assembled and run again at constant current until 208 hours.

As seen from FIG. 18, the break-in time was very short, and the cell practically immediately reached a state of constant performance. The initially improved performance after the re-assembly can be explained by the absorption of free water from the atmosphere, which reduces the viscosity of the phosphoric acid in the membrane and thus lowers the resistance of the membrane-electrode assembly (MEA). When the current density was increased to 600 mA/cm$^2$, the cell operated stable for over 100 hours, until a sudden drop in potential ended the test after 325 hours of operation.

As descried above, DFT analysis predicts that the tetrazole systems with 2,6-ether-substituted phenyl groups in the C5-position are coplanar systems, allowing for resonance stabilization. This is expected to increase the pK$_a$ values into the range of imidazole systems, allowing for efficient phosphoric acid doping, while still providing two potential sites for proton hopping, as suggested by molecular electrostatic potential (MEP) calculations. The tetrazole-based polymers according to the embodiments of the present disclosure can exhibit high proton conductivity even at low phosphoric acid content.

What is claimed is:

1. A 5-(2,6-dioxyphenyl)tetrazole-containing polymer comprising a structural unit represented by [Chemical Formula 1]:

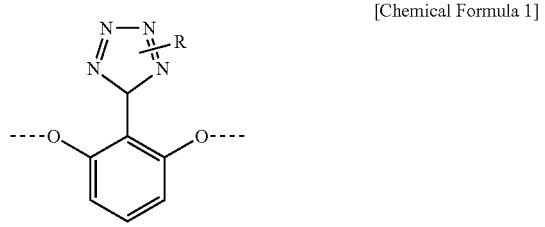

[Chemical Formula 1]

wherein R is H, alkyl (C$_1$-C$_{12}$ alkyl, linear or branched) or benzyl.

2. The 5-(2,6-dioxyphenyl)tetrazole-containing polymer according to claim 1, wherein the 5-(2,6-dioxyphenyl)tetrazole-containing polymer is obtained from one or more of the following monomers:

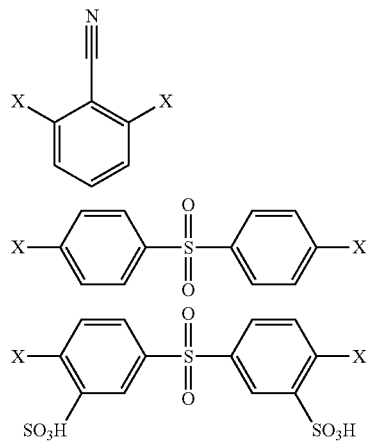

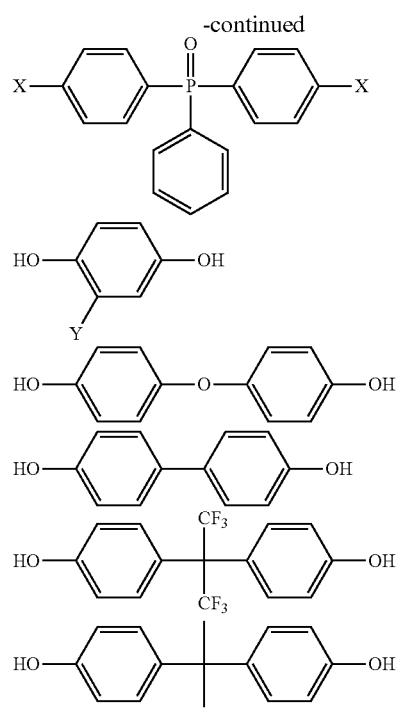

wherein X is Cl, F or OH and Y is H, methyl or SO$_3$H.

3. The 5-(2,6-dioxyphenyl)tetrazole-containing polymer according to claim 1, wherein the 5-(2,6-dioxyphenyl)tetrazole-containing polymer is one or more of the following compounds:

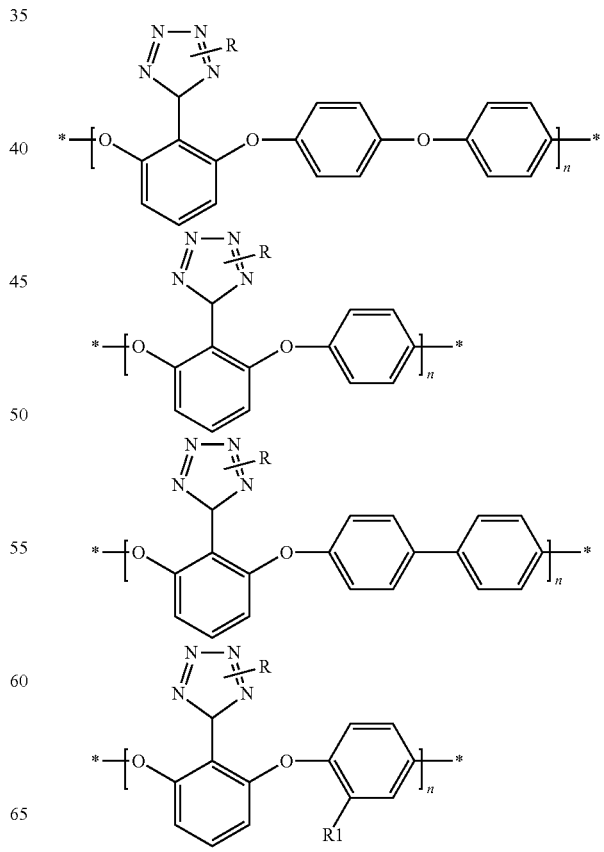

-continued

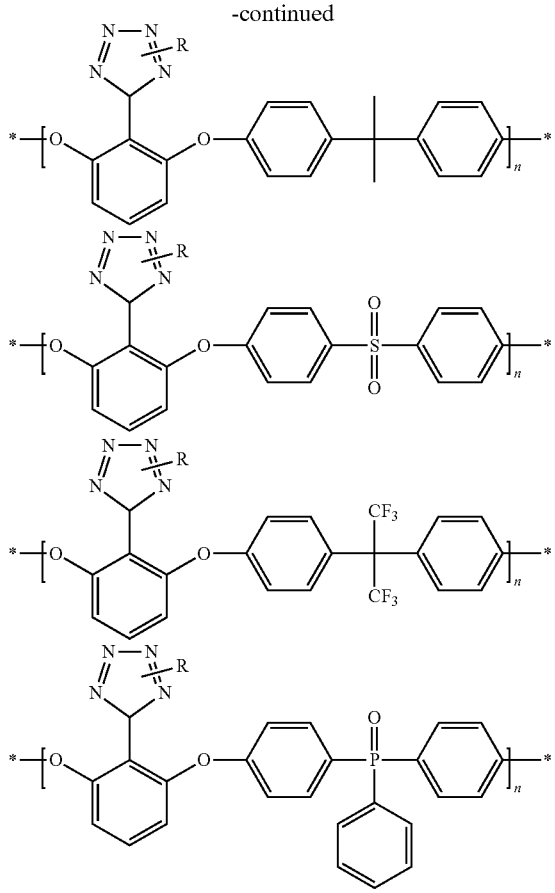

wherein R is H, alkyl ($C_1$-$C_{12}$ alkyl, linear or branched) or benzyl and R1 is one or more selected from H, methyl or $SO_3H$.

4. The 5-(2,6-dioxyphenyl)tetrazole-containing polymer according to claim 3, wherein unreacted nitrile groups are present in part of the 5-(2,6-dioxyphenyl)tetrazole-containing polymer.

5. The 5-(2,6-dioxyphenyl)tetrazole-containing polymer according to claim 1, wherein the 5-(2,6-dioxyphenyl)tetrazole-containing polymer is capable of exhibiting resonance stabilization of positive charge as tetrazole groups are protonated to tetrazolium ions.

6. The 5-(2,6-dioxyphenyl)tetrazole-containing polymer according to claim 1, wherein the 5-(2,6-dioxyphenyl)tetrazole-containing polymer is capable of providing sites for proton hopping in protonated state.

7. A polymer composition comprising the 5-(2,6-dioxyphenyl)tetrazole-containing polymer according to claim 1.

8. The polymer composition according to claim 7, wherein the polymer composition is a polymer composition wherein the 5-(2,6-dioxyphenyl)tetrazole-containing polymer is blended with a basic polymer.

9. The polymer composition according to claim 7, wherein the polymer composition is a polymer composition in which one or more selected from a group consisting of Nafion, a Nafion derivative, sulfonated poly(ether ether ketone) (SPEEK), sulfonated polysulfone, polysulfone, polyether, polyvinyl alcohol (PVA), meta-PBI, para-PBI, ortho-PBI, a PBI derivative, polyvinylphosphonic acid and a polymer containing pyridine or aminopyridine groups in main chain of the polymer or tethered to main chain of the polymer is blended with the 5-(2,6-dioxyphenyl)tetrazole-containing polymer.

10. A membrane formed of: a 5-(2,6-dioxyphenyl)tetrazole-containing polymer comprising a structural unit represented by [Chemical Formula 1]; or a polymer composition comprising the 5-(2,6-dioxyphenyl)tetrazole-containing polymer:

[Chemical Formula 1]

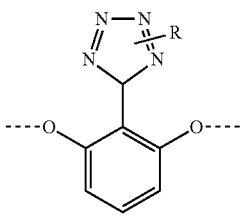

wherein R is H, alkyl ($C_1$-$C_{12}$ alkyl, linear or branched) or benzyl.

11. The membrane according to claim 10, wherein the membrane is a phosphoric acid-doped membrane.

12. The membrane according to claim 11, wherein the membrane has a phosphoric acid (PA) uptake of 20-2000 wt %.

13. An electrochemical device comprising the membrane according to claim 10.

14. The electrochemical device according to claim 13, wherein the electrochemical device is a fuel cell.

15. The electrochemical device according to claim 14, wherein the fuel cell is a high temperature polymer electrolyte membrane fuel cell.

16. The electrochemical device according to claim 15, wherein the high temperature polymer electrolyte membrane fuel cell is a high temperature polymer electrolyte membrane fuel cell that is capable of operating at 160° C.

* * * * *